ns011452101B2

United States Patent
Akkarakaran et al.

(10) Patent No.: US 11,452,101 B2
(45) Date of Patent: Sep. 20, 2022

(54) UPLINK BEAM ASSIGNMENT

(71) Applicant: QUALCOMM Incorporated, San Diego, CA (US)

(72) Inventors: Sony Akkarakaran, Poway, CA (US); Tao Luo, San Diego, CA (US); Xiao Feng Wang, San Diego, CA (US); Bilal Sadiq, Basking Ridge, NJ (US); Makesh Pravin John Wilson, San Diego, CA (US); Wooseok Nam, San Diego, CA (US); Yan Zhou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 30 days.

(21) Appl. No.: 16/275,065

(22) Filed: Feb. 13, 2019

(65) Prior Publication Data

US 2019/0261338 A1 Aug. 22, 2019

Related U.S. Application Data

(60) Provisional application No. 62/710,364, filed on Feb. 16, 2018.

(51) Int. Cl.
*H04W 72/04* (2009.01)
*H04L 5/00* (2006.01)
*H04B 7/06* (2006.01)

(52) U.S. Cl.
CPC ........ *H04W 72/046* (2013.01); *H04B 7/0619* (2013.01); *H04B 7/0695* (2013.01); *H04L 5/0048* (2013.01); *H04W 72/0413* (2013.01)

(58) Field of Classification Search
CPC ............ H04W 72/046; H04W 72/0413; H04B 7/0695; H04B 7/0619; H04L 5/0048
See application file for complete search history.

(56) References Cited

U.S. PATENT DOCUMENTS 8,958,379 B2 \* 2/2015 He ...................... H04W 72/042
370/329
2013/0286960 A1 10/2013 Li et al.
(Continued)

FOREIGN PATENT DOCUMENTS

WO WO-2014067146 A1 5/2014
WO WO-2017196612 A1 11/2017
WO WO-2018016907 A1 1/2018

OTHER PUBLICATIONS

Interdigital et al., "On Efficient UL Beam Management", 3GPP Draft; R1-1714143 on Efficient UL Beam Management, 3rd Generation Partnership Project (3GPP), Mobile Competence Centre ; 650, Route Des Lucioles ; F-06921 Sophia-Antipolis Cedex; France, vol. RAN WG1, No. Prague, Czech Republic; Aug. 21, 2017-Aug. 25, 2017, Aug. 20, 2017 (Aug. 20, 2017), XP051316932, 4 Pages, Retrieved from the Internet: URL:http://www.3gpp.org/ftp/Meetings_3GPP_SYNC/RAN1/Docs/ [retrieved on Aug. 20, 2017].
(Continued)

Primary Examiner — Nishant Divecha
(74) Attorney, Agent, or Firm — Holland & Hart LLP

(57) ABSTRACT

Methods, systems, and devices for wireless communications are described. Generally, the described techniques provide a mechanism for a user equipment (UE) to identify an uplink transmit beam to be used for communicating with a base station. In some cases, the uplink transmit beam may be based on a recent uplink (or downlink) transmission or set of allocated resources. A base station may allocate communication resources for a UE. The UE may determine, based on the allocated communication resources, a default transmit beam for communicating with the base station. The UE and base station may (e.g., independently) identify a triggering condition for using the default transmit beam. The UE may
(Continued)

transmit an uplink communication to the base station using the default transmit beam based on the triggering condition.

74 Claims, 17 Drawing Sheets

(56) References Cited

U.S. PATENT DOCUMENTS

| | | | |
|---|---|---|---|
| 2016/0183234 A1 | 6/2016 | Sung et al. | |
| 2018/0288757 A1* | 10/2018 | Sun | H04B 7/088 |
| 2018/0324678 A1* | 11/2018 | Chen | H04W 8/08 |
| 2019/0082335 A1* | 3/2019 | Yu | H04W 24/04 |
| 2019/0141693 A1* | 5/2019 | Guo | H04L 5/0044 |
| 2019/0289588 A1 | 9/2019 | Akkarakaran et al. | |
| 2020/0028545 A1* | 1/2020 | Koskela | H04B 7/0408 |
| 2020/0374960 A1* | 11/2020 | Deenoo | H04W 72/14 |

OTHER PUBLICATIONS

International Search Report and Written Opinion—PCT/US2019/018111—ISA/EPO—dated May 29, 2019.

Guangdong Oppo Mobile Telecom: "Some Remaining Issues on CORESET Configuration", 3GPP TSG RAN WG1 Meeting #90, R1-1713259, Prague, Czech Republic, Aug. 21-25, 2017, 9 Pages, Part 2.

Taiwan Search Report—TW108104968—TIPO—dated Mar. 11, 2022.

* cited by examiner

UPLINK BEAM ASSIGNMENT

CROSS REFERENCES

The present application for patent claims the benefit of U.S. Provisional Patent Application No. 62/710,364 by Akkarakaran et al., entitled "Uplink Beam Assignment," filed Feb. 16, 2018, assigned to the assignee hereof, and expressly incorporated by reference in its entirety herein.

BACKGROUND

The following relates generally to wireless communications, and more specifically to uplink beam assignment.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-s-OFDM). A wireless multiple-access communications system may include a number of base stations or network access nodes, each simultaneously supporting communication for multiple communication devices, which may be otherwise known as user equipment (UE).

Some wireless communications systems may support beamformed transmissions (e.g., which may improve a communication range, a signal quality, a spectral efficiency, etc.). For example, two communicating devices (e.g., a UE and base station, two UEs) may identify respective transmit and receive beams for exchanging data. In some cases, such beams may be identified based in part on signal quality information exchanged between the communicating devices. For example, a first device may transmit information (e.g., reference signals) across multiple candidate transmit beams to a second device, which may then indicate a preferred transmit beam (e.g., based on a received signal quality) of the candidate transmit beams. However, such an indication may negatively impact the wireless communications system (e.g., by increasing latency and/or signaling overhead, each of which may contribute to a decreased throughput). Improved techniques for beam assignment may be desired.

SUMMARY

The described techniques relate to improved methods, systems, devices, or apparatuses that support uplink beam assignment. Generally, the described techniques provide a mechanism for a user equipment (UE) to identify an uplink transmit beam to be used for communicating with a base station. In some cases, the uplink transmit beam may be based on a recent uplink (or downlink) transmission or set of allocated resources. For example, the transmission or allocated resources may be semi-statically (or dynamically) configured for use by the UE, which may be operable to identify an uplink transmit beam based on the transmission or allocated resources. In some cases, a base station may explicitly indicate a transmit beam to be used by the UE for uplink communications. However, in the absence of (e.g., or in addition to) such an indication, the UE may be operable to identify a default uplink transmit beam based on a previous transmission or set of allocated resources. By defining such a mechanism through which a UE and base station may implicitly identify a transmit beam (e.g., without explicitly signaling which beam should be used), communication quality may be improved.

A method of wireless communication at a UE is described. The method may include determining, based on communication resources allocated by a base station, a default transmit beam for communicating with the base station, identifying a triggering condition for using the default transmit beam, and transmitting an uplink communication to the base station using the default transmit beam based on the triggering condition.

An apparatus for wireless communication at a UE is described. The apparatus may include means for determining, based on communication resources allocated by a base station, a default transmit beam for communicating with the base station, means for identifying a triggering condition for using the default transmit beam, and means for transmitting an uplink communication to the base station using the default transmit beam based on the triggering condition.

Another apparatus for wireless communication at a UE is described. The apparatus may include a processor, memory in electronic communication with the processor, and instructions stored in the memory. The instructions may be executable by the processor to cause the apparatus to determine, based on communication resources allocated by a base station, a default transmit beam for communicating with the base station, identify a triggering condition for using the default transmit beam, and transmit an uplink communication to the base station using the default transmit beam based on the triggering condition.

A non-transitory computer-readable medium storing code for wireless communication at a UE is described. The code may include instructions executable by a processor to determine, based on communication resources allocated by a base station, a default transmit beam for communicating with the base station, identify a triggering condition for using the default transmit beam, and transmit an uplink communication to the base station using the default transmit beam based on the triggering condition.

In some examples of the method, apparatus, and non-transitory computer-readable medium described herein, identifying the triggering condition includes receiving, from the base station, an uplink grant that does not contain a physical uplink shared channel (PUSCH) beam indicator.

In some examples of the method, apparatus, and non-transitory computer-readable medium described herein, the PUSCH beam indicator includes a sounding reference signal (SRS) resource indicator (SRI) or a transmission configuration indicator (TCI).

In some examples of the method, apparatus, and non-transitory computer-readable medium described herein, identifying the triggering condition includes identifying uplink data to be transmitted to the base station in the uplink communication. Some examples of the method, apparatus, and non-transitory computer-readable medium described herein may further include processes, features, means, or instructions for determining that the base station may have not transmitted a PUSCH beam indicator indicating a configured uplink transmit beam for the uplink communication.

In some examples of the method, apparatus, and non-transitory computer-readable medium described herein, identifying the trigger condition includes identifying a threshold time period preceding the uplink communication. Some examples of the method, apparatus, and non-transitory computer-readable medium described herein may further include processes, features, means, or instructions for determining that the base station may have not transmitted a PUSCH beam indicator indicating a configured uplink transmit beam for the uplink communication prior to the threshold time period.

In some examples of the method, apparatus, and non-transitory computer-readable medium described herein, the threshold time period may be based on a beam-switching capability of the UE.

In some examples of the method, apparatus, and non-transitory computer-readable medium described herein, determining the default transmit beam includes identifying a receive beam used to receive a remaining minimum system information (RMSI) control resource set, where the RMSI control resource set includes the allocated communication resources. Some examples of the method, apparatus, and non-transitory computer-readable medium described herein may further include processes, features, means, or instructions for selecting, prior to a completion of a radio resource control (RRC) configuration, the default transmit beam based on the receive beam.

In some examples of the method, apparatus, and non-transitory computer-readable medium described herein, determining the default transmit beam includes receiving a downlink transmission from the base station over the allocated communication resources using a downlink receive beam. Some examples of the method, apparatus, and non-transitory computer-readable medium described herein may further include processes, features, means, or instructions for determining the default transmit beam based on the downlink receive beam.

In some examples of the method, apparatus, and non-transitory computer-readable medium described herein, the downlink transmission includes a physical downlink control channel (PDCCH) transmission and the allocated communication resources include a PDCCH control resource set.

Some examples of the method, apparatus, and non-transitory computer-readable medium described herein may further include processes, features, means, or instructions for identifying the PDCCH control resource set from a set of candidate PDCCH control resource sets based on an index associated with the PDCCH control resource set.

Some examples of the method, apparatus, and non-transitory computer-readable medium described herein may further include processes, features, means, or instructions for identifying the PDCCH control resource set from a set of candidate PDCCH control resource sets based on a reception time at the UE associated with the PDCCH control resource set.

Some examples of the method, apparatus, and non-transitory computer-readable medium described herein may further include processes, features, means, or instructions for selecting, based on an index associated with the PDCCH control resource set, the PDCCH control resource set from the set of candidate PDCCH control resource sets, where the set of candidate PDCCH control resource sets may be associated with a same reception time at the UE.

In some examples of the method, apparatus, and non-transitory computer-readable medium described herein, receiving the downlink transmission includes receiving one or more channel state information reference signals (CSI-RS) over the allocated communication resources, where each CSI-RS may be received using a respective downlink receive beam. Some examples of the method, apparatus, and non-transitory computer-readable medium described herein may further include processes, features, means, or instructions for identifying a given downlink receive beam of the one or more downlink receive beams. Some examples of the method, apparatus, and non-transitory computer-readable medium described herein may further include processes, features, means, or instructions for determining the default transmit beam based on the given downlink receive beam.

In some examples of the method, apparatus, and non-transitory computer-readable medium described herein, the downlink transmission includes a physical downlink shared channel (PDSCH) transmission.

Some examples of the method, apparatus, and non-transitory computer-readable medium described herein may further include processes, features, means, or instructions for identifying the downlink transmission to be used for determining the default transmit beam from a set of candidate downlink transmissions based on a scheduling parameter of the downlink transmission, a number of beams associated with the downlink transmission, a selection indication received from the base station, or a combination thereof.

In some examples of the method, apparatus, and non-transitory computer-readable medium described herein, determining the default transmit beam includes receiving a semi-static configuration or a dynamic configuration for the allocated communication resources, where the allocated communication resources may be designated for carrying a first uplink transmission to the base station using a first uplink transmit beam. Some examples of the method, apparatus, and non-transitory computer-readable medium described herein may further include processes, features, means, or instructions for determining the default transmit beam based on the first uplink transmit beam.

In some examples of the method, apparatus, and non-transitory computer-readable medium described herein, the first uplink transmission includes a physical uplink control channel (PUCCH) transmission and the allocated communication resources include a PUCCH resource.

Some examples of the method, apparatus, and non-transitory computer-readable medium described herein may further include processes, features, means, or instructions for identifying the PUCCH resource from a set of candidate PUCCH resources based on an index associated with the PUCCH resource, an intended use of the PUCCH resource, or a combination thereof.

In some examples of the method apparatus, and non-transitory computer-readable medium described herein, identifying the PUCCH resource from the plurality of candidate PUCCH resources may further include identifying the PUCCH resource based on the identified PUCCH resource being the PUCCH resource with a lowest index.

In some examples of the method, apparatus, and non-transitory computer-readable medium described herein, the intended use of the PUCCH resource includes one of a scheduling request (SR), a channel quality indicator (CQI) report, or a beam failure recovery.

In some examples of the method, apparatus, and non-transitory computer-readable medium described herein, the first uplink transmission includes an SRS transmission, a PUSCH transmission scheduled by an uplink grant that includes a PUSCH beam indicator, a semi-persistent scheduled (SPS) transmission, or a grant-free uplink transmission.

Some examples of the method, apparatus, and non-transitory computer-readable medium described herein may further include processes, features, means, or instructions for identifying the first uplink transmission to be used for determining the default transmit beam from a set of candidate uplink transmissions based on a scheduling parameter of the first uplink transmission, a number of beams associated with the first uplink transmission, a selection indication received from the base station, or a combination thereof.

In some examples of the method, apparatus, and non-transitory computer-readable medium described herein, determining the default transmit beam includes identifying a communication beam corresponding to a recent transmission, the recent transmission including a recent uplink transmission or a recent downlink transmission. Some examples of the method, apparatus, and non-transitory computer-readable medium described herein may further include processes, features, means, or instructions for determining the default transmit beam based on the communication beam.

In some examples of the method, apparatus, and non-transitory computer-readable medium described herein, transmitting the uplink communication using the default transmit beam includes receiving, from the base station, an update to the allocated communication resources. Some examples of the method, apparatus, and non-transitory computer-readable medium described herein may further include processes, features, means, or instructions for determining a second default transmit beam based on the update, where the uplink transmission may be transmitted using the second default transmit beam.

A method of wireless communication at a base station is described. The method may include allocating communication resources for a UE, identifying a triggering condition that indicates to the UE to use a default transmit beam for communicating with the base station, where the default transmit beam is based on the allocated communication resources, and receiving, based on the triggering condition, an uplink communication from the UE, where the uplink communication is transmitted by the UE using the default transmit beam.

An apparatus for wireless communication at a base station is described. The apparatus may include means for allocating communication resources for a UE, means for identifying a triggering condition that indicates to the UE to use a default transmit beam for communicating with the base station, where the default transmit beam is based on the allocated communication resources, and means for receiving, based on the triggering condition, an uplink communication from the UE, where the uplink communication is transmitted by the UE using the default transmit beam.

Another apparatus for wireless communication at a base station is described. The apparatus may include a processor, memory in electronic communication with the processor, and instructions stored in the memory. The instructions may be executable by the processor to cause the apparatus to allocate communication resources for a UE, identify a triggering condition that indicates to the UE to use a default transmit beam for communicating with the base station, where the default transmit beam is based on the allocated communication resources, and receive, based on the triggering condition, an uplink communication from the UE, where the uplink communication is transmitted by the UE using the default transmit beam.

A non-transitory computer-readable medium storing code for wireless communication at a base station is described. The code may include instructions executable by a processor to allocate communication resources for a UE, identify a triggering condition that indicates to the UE to use a default transmit beam for communicating with the base station, where the default transmit beam is based on the allocated communication resources, and receive, based on the triggering condition, an uplink communication from the UE, where the uplink communication is transmitted by the UE using the default transmit beam.

In some examples of the method, apparatus, and non-transitory computer-readable medium described herein, identifying the triggering condition includes transmitting, to the UE, an uplink grant that does not contain a PUSCH beam indicator.

In some examples of the method, apparatus, and non-transitory computer-readable medium described herein, the PUSCH beam indicator includes an SRI or a TCI.

In some examples of the method, apparatus, and non-transitory computer-readable medium described herein, allocating the communication resources for the UE comprises configuring, for the UE, a RMSI control resource set. Some examples of the method, apparatus, and non-transitory computer-readable medium described herein may further include processes, features, means, or instructions for identifying, prior to a completion of an RRC configuration, the default transmit beam based on the RMSI control resource set.

Some examples of the method, apparatus, and non-transitory computer-readable medium described herein may further include processes, features, means, or instructions for transmitting a downlink transmission to the UE over the allocated communication resources, where the uplink communication may be transmitted by the UE using the default transmit beam based on the downlink transmission.

In some examples of the method, apparatus, and non-transitory computer-readable medium described herein, the downlink transmission includes a PDCCH transmission and the allocated communication resources include a PDCCH control resource set.

Some examples of the method, apparatus, and non-transitory computer-readable medium described herein may further include processes, features, means, or instructions for identifying the PDCCH control resource set from a set of candidate PDCCH control resource sets based on an index associated with the PDCCH control resource set.

In some examples of the method, apparatus, and non-transitory computer-readable medium described herein, transmitting the downlink transmission includes transmitting one or more CSI-RS over the allocated communication resources, where the uplink communication may be transmitted by the UE using the default transmit beam based on the one or more CSI-RS.

In some examples of the method, apparatus, and non-transitory computer-readable medium described herein, the downlink transmission includes a PDSCH transmission.

Some examples of the method, apparatus, and non-transitory computer-readable medium described herein may further include processes, features, means, or instructions for identifying the downlink transmission to be used by the UE for determining the default transmit beam from a set of candidate downlink transmissions based on a scheduling parameter of the downlink transmission, a number of beams associated with the downlink transmission, a selection indication received from the base station, or a combination thereof.

In some examples of the method, apparatus, and non-transitory computer-readable medium described herein, allocating the communication resources for the UE includes transmitting a semi-static configuration or a dynamic configuration allocating the communication resources, which may be designated for carrying a first uplink transmission from the UE to the base station using a first uplink transmit beam, where the uplink communication may be transmitted by the UE using the default transmit beam based on the first uplink transmit beam.

In some examples of the method, apparatus, and non-transitory computer-readable medium described herein, the first uplink transmission includes a PUCCH transmission and the allocated communication resources include a PUCCH resource.

Some examples of the method, apparatus, and non-transitory computer-readable medium described herein may further include processes, features, means, or instructions for identifying the PUCCH resource from a set of candidate PUCCH resources based on an index associated with the PUCCH resource, an intended use of the PUCCH resource, or a combination thereof.

In some examples of the method, apparatus, and non-transitory computer-readable medium described herein, the intended use of the PUCCH resource includes one of an SR, a CQI report, or a beam failure recovery.

In some examples of the method, apparatus, and non-transitory computer-readable medium described herein, the first uplink transmission includes an SRS transmission, a PUSCH transmission scheduled by an uplink grant that includes a PUSCH beam indicator, a SPS transmission, or a grant-free uplink transmission.

Some examples of the method, apparatus, and non-transitory computer-readable medium described herein may further include processes, features, means, or instructions for identifying the first uplink transmission to be used by the UE for determining the default transmit beam from a set of candidate uplink transmissions based on a scheduling parameter of the first uplink transmission, a number of beams associated with the first uplink transmission, a selection indication transmitted by the base station, or a combination thereof.

Some examples of the method, apparatus, and non-transitory computer-readable medium described herein may further include processes, features, means, or instructions for identifying a communication beam corresponding to a recent transmission, the recent transmission including a recent uplink transmission from the UE or a recent downlink transmission to the UE, where the uplink communication may be transmitted by the UE using the default transmit beam based on the communication beam.

Some examples of the method, apparatus, and non-transitory computer-readable medium described herein may further include processes, features, means, or instructions for transmitting, to the UE, an update to the allocated communication resources, where the uplink communication may be transmitted by the UE on the default transmit beam based on the update.

DETAILED DESCRIPTION

Some wireless communications systems may operate in frequency ranges that support beamformed transmissions. For example, communications in some frequency ranges (e.g., millimeter wave (mmW) frequencies and the like) may experience increased signal attenuation (e.g., path loss). As a result, signal processing techniques, such as beamforming, may be used to combine energy coherently and overcome the path losses in these systems. Such beamformed transmissions, while providing benefits in terms of transmission reliability and/or system throughput, may in some cases be associated with increased system complexity. For example, communicating devices (e.g., a user equipment (UE) and base station) may need to negotiate transmit and receive beams in order to support the beamformed transmissions. Such negotiations may not be desirable (e.g., or possible) in all communication scenarios. For example, these negotiations may increase latency and/or signaling overhead.

In accordance with the described techniques, a UE and base station may be operable to identify a default uplink transmit beam which the UE may use to communicate uplink data to the base station. For example, the default uplink transmit beam may be based on a set of allocated communication resources and/or a recent transmission (e.g., an uplink transmission or a downlink transmission). The UE may use the default uplink transmit beam for uplink communications in scenarios where it does not receive an indication of an uplink beam to use from the network. In some cases, without such an indication from the network, the UE may be unable to determine which uplink beam to use, which may increase latency and similar inefficiencies in a wireless communications system. Therefore, wireless communications systems which allow for such default beam determination and use may experience various benefits, as described herein. Aspects of the following describe techniques and considerations for determining an adequate default uplink transmit beam.

Aspects of the disclosure are initially described in the context of a wireless communications system. Aspects of the disclosure are then described in the context of a process flow. Aspects of the disclosure are further illustrated by and described with reference to apparatus diagrams, system diagrams, and flowcharts that relate to uplink beam assignment.

Figure 1:
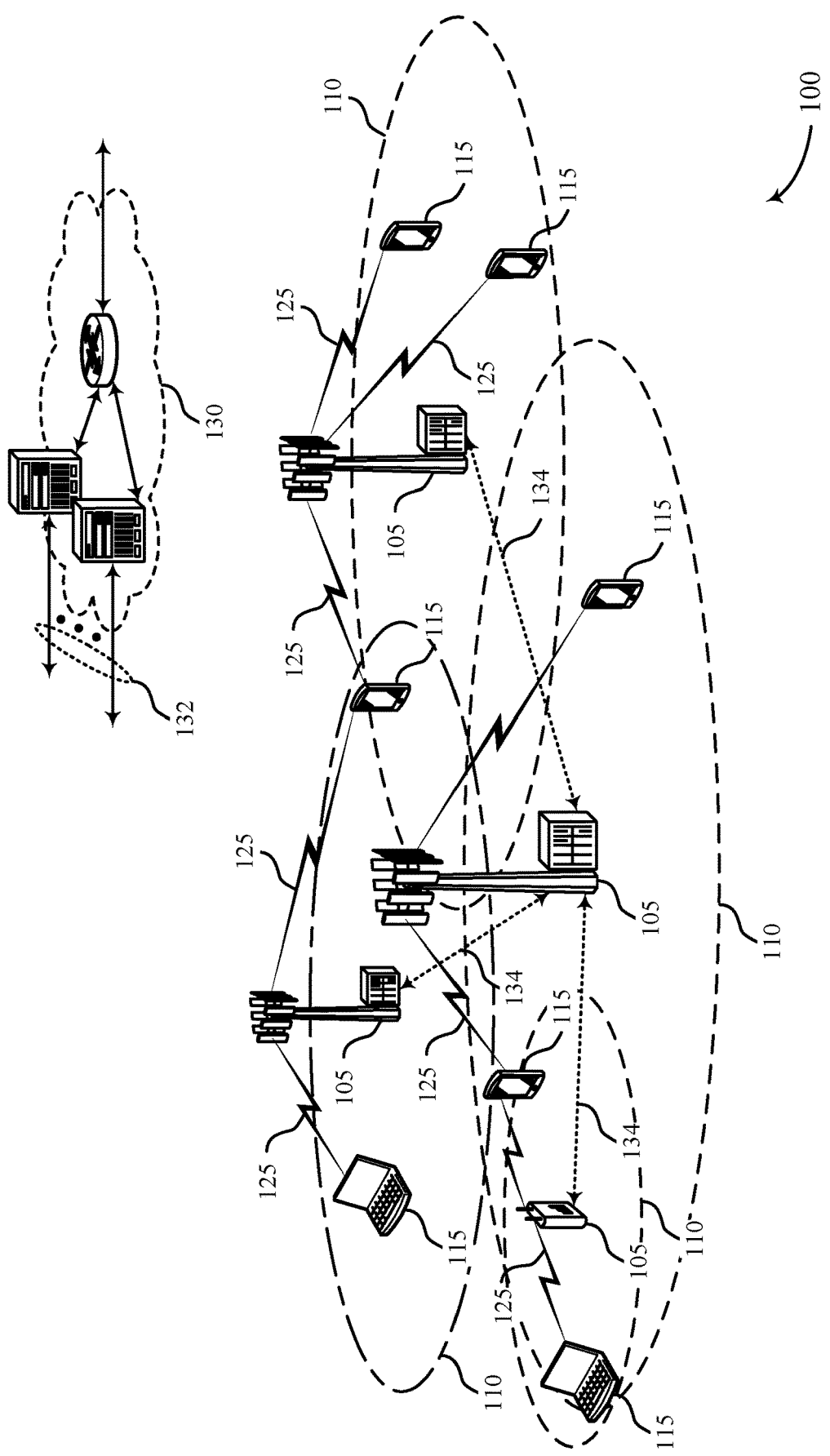
FIG. 1 illustrates an example of a wireless communications system that supports uplink beam assignment in accordance with aspects of the present disclosure.

FIG. 1 illustrates an example of a wireless communications system 100 that supports uplink beam assignment in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support mmW communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a set of antenna elements of an antenna array, or by processing received signals according to different receive beamforming weight sets applied to signals received at a set of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers (CCs) using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-s-OFDM)).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation (CA) configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or resource blocks (RBs)) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as CA configuration or multi-carrier operation. A UE 115 may be configured with multiple downlink CCs) and one or more uplink CCs according to a CA configuration. CA may be used with both FDD and TDD CCs.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a CA configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In accordance with the described techniques, a base station 105 may allocate communication resources for a UE 115. Examples of such communication resources are described further herein and include physical uplink shared channel (PUSCH) resources, physical uplink control channel (PUCCH) resources, physical downlink shared channel (PDSCH) resources, and physical downlink control channel (PDCCH) resources. In some cases, the communication resources may be associated with a transmission (e.g., which may be sent using a given transmit beam and received using a given receive beam). As described further herein, the UE 115 and base station 105 may identify a default uplink transmit beam to be used by the UE 115 for communicating uplink transmissions based on the allocated communication resources (e.g., or the given transmit beam and/or the given receive beam). The UE 115 and base station 105 may identify a triggering condition for the UE 115 to use the default uplink transmit beam for communications. For example, the UE 115 may determine that it has not received an indication from the base station 105 of a particular uplink beam to use, or a beam indication from the base station 105 may have been received too late for the UE 115 to process the indication and configure the indicated uplink beam in time.

Figure 2:
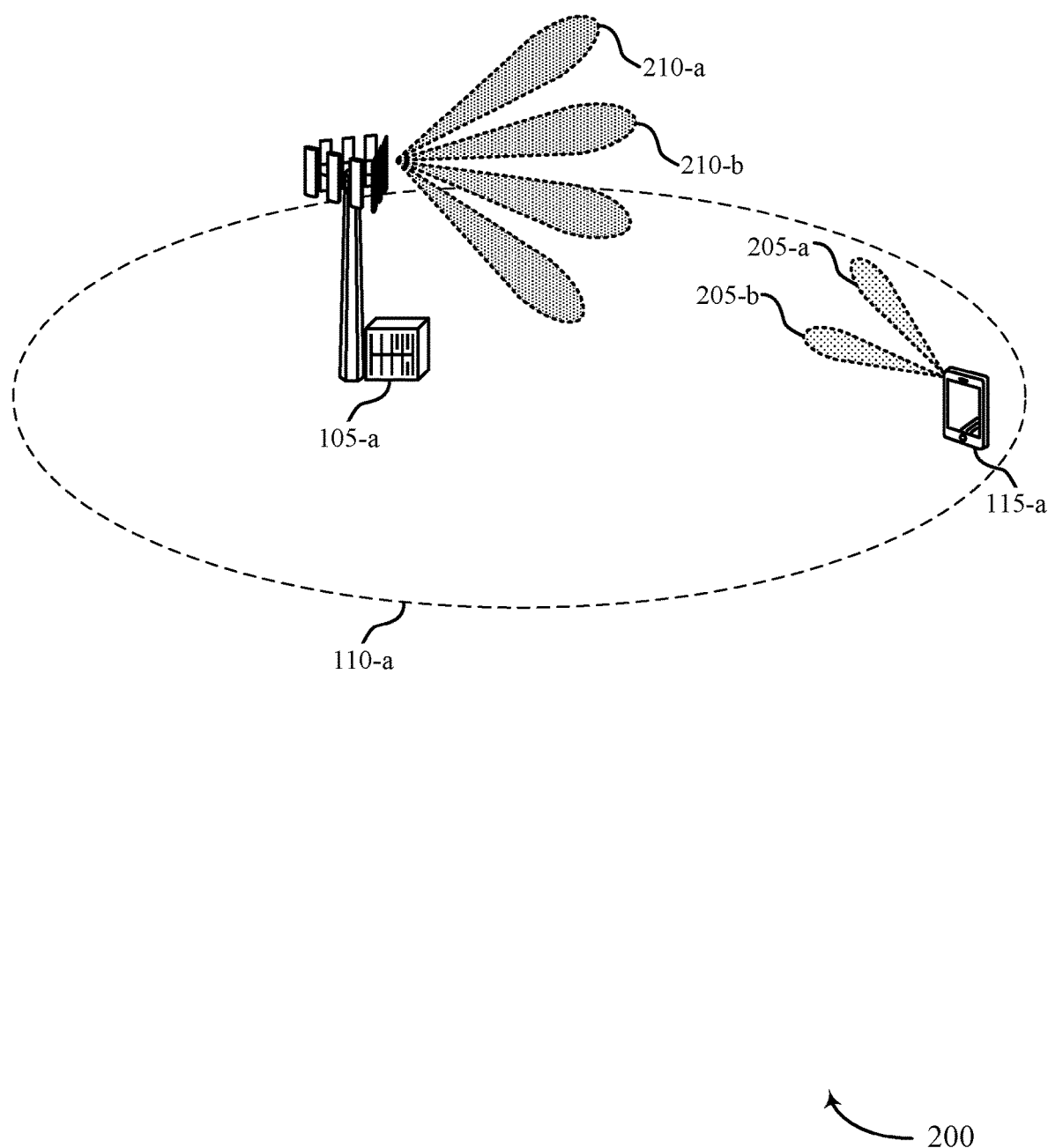
FIG. 2 illustrates an example of a wireless communications system that supports uplink beam assignment in accordance with aspects of the present disclosure.

FIG. 2 illustrates an example of a wireless communications system 200 that supports uplink beam assignment in accordance with aspects of the present disclosure. Wireless communications system 200 includes a base station 105-a and a UE 115-a, each of which may be an example of the corresponding device described with reference to FIG. 1.

Wireless communications system 200 may operate in frequency ranges that are associated with beamformed transmissions between base station 105-a and UE 115-a. For example, wireless communications system 200 may operate using mmW frequency ranges (e.g., or other frequency ranges). As a result, signal processing techniques, such as beamforming, may be used to combine energy coherently and to overcome path losses.

By way of example, base station 105-a may contain multiple antennas. In some cases, each antenna may transmit a phase-shifted version of a signal such that the phase-shifted versions constructively interfere in certain regions and destructively interfere in others. Weights may be applied to the various phase-shifted versions, e.g., in order to steer the transmissions in a desired direction. Such techniques (or similar techniques) may serve to increase the coverage area 110-a of the base station 105-a or otherwise benefit the wireless communications system 200.

Transmit beams 205-a and 205-b represent examples of beams over which data may be transmitted. Accordingly, each transmit beam 205 may be directed from UE 115-a toward a different region of the coverage area 110-a and in some cases, two or more beams may overlap. Transmit beams 205-a and 205-b may be transmitted simultaneously or at different times. In either case, a base station 105-a may be capable of receiving one or more transmit beams 205 via respective receive beams 210-a and 210-b.

In one example, UE 115-a may form one or more transmit beams 205. Similar to base station 105-a, UE 115-a may contain multiple antennas. The transmit beams 210-a and 210-b may each be received using one of the receive beams 210-a and 210-b (e.g., UE 115-a may be positioned within wireless communications systems 200 such that base station 105-a receives both beamformed transmit beams 205). Such a scheme may be referred to as a receive-diversity scheme. In some cases, the receive beams 210 may receive a single transmit beam 205-a (e.g., receive beam 210-a may receive the transmit beam 205-a with various pathloss and multipath effects included). That is, each antenna of base station 105-a may receive the transmit beam 205-a which has experienced different path losses or phase shifts (e.g., different phase shifts due to the different path lengths between the base station 105-a and the respective antennas of the UE 115-a) and appropriately combine the received signals represented by receive beams 210-a and 210-b. A transmit beam 205 and a corresponding receive beam 210 may be referred to as a beam pair link.

In some cases, UE 115-a may identify a transmit beam 205 to use for a PUSCH transmission based on a beam indicator received from base station 105-a. For example, the beam indicator may be a sounding reference signal (SRS) resource indicator (SRI) or a transmission configuration indicator (TCI), each of which may be carried in a downlink control information (DCI) transmission from base station 105-a. A beam indicator may implicitly or explicitly indicate to the UE 115-a which uplink or downlink beam to use for subsequent uplink or downlink communications. For example, an SRI may indicate to the UE 115-a to use particular uplink beam that was used for a previously transmitted SRS transmission. Alternatively, a TCI may indicate to the UE 115-a to use a particular downlink receive beam that was used for a previously received reference signal (e.g., a CSI-RS) or a particular uplink transmit beam such as a beam for SRS. Thus, in some examples, a TCI may be considered as a generalization of an SRI.

As an example, UE 115-a may be configured with an SRS resource set including one or more SRS resources, each of which is transmitted over a respective transmit beam 205 (e.g., for channel sounding). Base station 105-a may process the SRS transmission(s) an indicate a preferred transmit beam 205 for uplink communications from UE 115-a in the form of an SRI. The SRI may represent an index into one of the multiple SRS resources within the SRS resource set (where each SRS resource is associated with a respective transmit beam 205). A PUSCH transmission may be quasi-co located (i.e., use the same transmit beam 205) as the SRS sent on the resources indicated by the SRI. Thus, in cases in which the SRI is received, UE 115-a may know which transmit beam 205 to use for communicating with base station 105-a.

However, the uplink grant (e.g., which may be contained in the DCI transmission) may not always contain SRI, in which cases the transmit beam 205 for the PUSCH transmission may not be specified. For example, the DCI transmission may be a fall-back DCI transmission (e.g., which may not contain an SRI field as part of the uplink grant). In other cases (e.g., for semi-persistent scheduled (SPS) uplink transmissions), the PUSCH resources may not have an associated grant which can include the SRI. That is, while the SPS activation (e.g., which may trigger the use of resources preconfigured via radio resource control (RRC) signaling) may include a beam indication, the indicated transmit beam 205 may not be suitable for subsequent uplink transmissions (e.g., due to changing channel conditions). In other examples, UE 115-a may not be configured to transmit SRS (e.g., in which case the transmit beam 205 will be unspecified because base station 105-a does not have SRS resources for which to transmit a beam indicator). In such cases (e.g., among others), aspects of the following may be used to identify a default transmit beam 205. The identification of such cases may be referred to as a triggering condition for the UE 115-a to use a default uplink transmit beam.

For example, the default transmit beam 205 may be associated with a recent uplink or downlink transmission (e.g., or resources which are configured to carry such transmissions). For example, base station 105-a may configure resources for UE 115-a to use for uplink transmissions such as scheduling request (SR) transmissions. While such resources may not be used in some cases (e.g., because UE 115-a does not have data to transmit over these resources), the resources may still be used to identify a default transmit beam 205 in aspects of the present disclosure. In some cases, the transmission or resources may be semi-statically configured (e.g., SPS resources). Additionally or alternatively, the resources may be dynamically scheduled. Dynamically scheduled resources may in some cases be associated with increased transmit beam 205 ambiguity (e.g., because of the possibility of UE 115-a not receiving the grant scheduling the resources), though such ambiguity may be addressed using aspects of the techniques described herein.

In accordance with the described techniques, the default transmit beam 205 may be used whenever SRS or SRI is absent (e.g., if the SRI arrives too late to be useful). For example, UE 115-a may need to receive the SRI prior to some timing threshold in order to program the uplink transmit beam 205 in response to the SRI. Thus, the timing threshold may in some cases vary between UEs 115 (e.g., based on a beam-switching capability of the UE 115).

In a first set of examples, the default transmit beam 205 may be identified based on one or more downlink transmissions or resources. For example, the default transmit beam may be selected based on the beam that UE 115-a uses to receive a recent PDCCH control resource set. For example, the recent PDCCH control resource set may be a control resource set that is received prior to some threshold time as described herein. In aspects of the present disclosure, a PDCCH control resource set may be selected from a set of candidate PDCCH control resource sets (e.g., based on an index of the PDCCH control resource set). For example, UE 115-a may in some cases identify a PDCCH control resource set having a lowest index among the candidate PDCCH control resource sets. In some cases, UE 115-a may restrict the candidate pool based on a reception time of the PDCCH control resource set(s). For example, UE 115-a may pick the control resource set within a configured search space or a configured candidate whose reception completes at a recent (e.g., the most recent) OFDM symbol. In the case that multiple PDCCH control resource sets are received during the OFDM symbol, UE 115-a may employ a tie-breaking procedure (e.g., may select the lowest indexed control resource set, the highest indexed control resource set, etc. among the multiple PDCCH control resource sets). Using the recently received PDCCH control resource set may in some cases eliminate (e.g., or mitigate) the need for beam-switching between PDCCH and PUSCH (e.g., which may save processing power, may reduce latency, or may provide other such benefits for UE 115-a).

As another example, the default transmit beam 205 may be selected based on the beam of a recent channel state information reference signal (CSI-RS) transmission (e.g., which may be a semi-persistent CSI-RS, a persistent CSI-RS, or an aperiodic or dynamically scheduled CSI-RS). CSI-RS may be used to perform channel sounding in the downlink. Thus, CSI-RS may be transmitted over one (or more) beams, and UE 115-a may select one of these beams to use in identifying the default transmit beam 205 (e.g., a most recent beam, a lowest indexed beam, etc.). However, some such rules for selecting one of the beams may be arbitrary (e.g., may not be guaranteed to select the best beam because base station 105-a may not know which beam is ideal, without receiving feedback from UE 115-a). However, in some cases only a single CSI-RS beam may be used (e.g., to measure frequency selectivity within the channel), in which case the arbitrary nature of the selection process may be obviated.

As another example, the default transmit beam 205 may be selected based on the beam of a recent PDSCH transmission. Such a scheme may in some cases suffer from the issue of missing the grant for the PDSCH (e.g., as discussed herein). However, this issue may be mitigated if there is ongoing SPS downlink PDSCH (e.g., which may not require grants), in which case the beam may be used to select to the default transmit beam 205. Such SPS downlink PDSCH may in some cases use a recent PDCCH transmission to define its own beam. However, this approach may not be equivalent to directly using the recent PDCCH beam (e.g., because of different periodicities for the PDCCH and SPS downlink PDSCH).

In some cases, UE 115-a may use a combination of the downlink-based schemes described herein (e.g., the beam of a recent transmission, where the transmission may be PDCCH, PDSCH, CSI-RS, or some subset thereof). By way of example, UE 115-a may select only the SPS downlink PDSCH as a default, but may instead select the default transmit beam 205 based on a recent CSI-RS beam if CSI-RS uses only one beam.

In some examples, these downlink-based schemes may be more suited for UEs 115 with uplink/downlink beam correspondence (e.g., reciprocity) in which downlink receive beams are also suitable for uplink transmissions. However, not all UEs 115 may support such reciprocity. Such UEs 115 (e.g., as well as UEs 115 supporting reciprocity in some cases) may benefit from uplink-based schemes.

Thus, in a second (e.g., complementary) set of examples, the default transmit beam 205 may be identified based on one or more uplink transmissions or resources. As an example, the default transmit beam 205 may be selected based on the beam of a recent PUCCH resource (e.g., which may be a configured resource which is not actually used for carrying a transmission such as an unused SR resource or a resource carrying a PUCCH transmission). However, using the actually transmitted PUCCH resource may cause ambiguity between UE 115-a and base station 105-a (e.g., because of the missed transmission issue discussed herein in relation to the grant-based downlink transmissions). PUCCH resources may in some cases be configured for one or more of multiple purposes (e.g., SR, periodic, semi-persistent, or aperiodic channel quality indicator (CQI) reports, beam failure recovery, etc.). PUCCH resources configured for each of these purposes may in some cases be associated with different periodicities. Further, within SR resources, separate PUCCH resource configurations may be present for SR for each of a set of different logical channels. In some cases, the default transmit beam 205 may be selected based on the PUCCH resources associated with a specific one of these purposes (e.g., SR resources) or may be selected base on the PUCCH resources associated with a recent transmission among all of these purposes. For example, the recency of the transmission may be defined with a time granularity of a slot-basis or an OFDM symbol basis. As discussed with respect to the PDCCH control resource sets, any ties among PUCCH resources may be resolved by selecting based on the PUCCH resource index (e.g., or by the frequency domain index of the resource). In some cases, the PUCCH resource for beam-failure recovery may be beam-swept (e.g., and hence unsuitable for selecting default transmit beam 205).

Additionally or alternatively, the PUCCH resource may be dynamically selected (e.g., for acknowledgment (ACK) transmissions). In some cases, multiple ACK resources each with a different beam may be configured, amongst which one is selected for transmitting the ACK. Thus, in some cases the default transmit beam 205 may be selected based on the beam corresponding to a recently transmitted ACK. However, because the ACK transmission may itself generally be a dynamic transmission (e.g., based on a dynamically scheduled PDSCH transmission), such a scheme may suffer from the missed transmission issue discussed herein.

In another example, the beam of a recent SRS resource (e.g., a persistent, semi-persistent, or aperiodic SRS resource) may be used. Such a scheme may experience similar benefits and drawbacks to those discussed with reference to the CSI-RS scheme. For example, the dynamically scheduled SRS may suffer from missed transmission issues, and it may be difficult to resolve the arbitrary selection of an SRS resource (e.g., because UE 115-a may not know which SRS resource corresponds to the best beam in the absence of an SRI from base station 105-a). In another example, the beam of a recent PUSCH transmission that is based on an SRI may be used.

As with the downlink schemes, UE 115-a may use a combination of the uplink-based schemes described herein (e.g., the beam of a recent transmission, where the transmission may be SRS, PUCCH, PUSCH, or some subset thereof). Additionally or alternatively, UE 115-a may use some hybrid of the downlink and uplink-based schemes discussed herein (e.g., may use a recent transmission, regardless of whether it was an uplink or downlink transmission). Further, in some cases, UE 115-a may be able to switch between various schemes described herein (e.g., where the switching may be done autonomously or may be based on signaling received from base station 105-a).

Aspects of the present disclosure also relate to handling updates for the default uplink transmit beam 205. For example, the default uplink transmit beam 205 may be associated with a previous transmission (or reception or allocated resource). However, the beam for that resource or transmission may be semi-statically updated (e.g., by a MAC control element (MAC-CE) or RRC signaling) after the resource has been used but prior to transmission of the PUSCH over default transmit beam 205. In some such cases, semi-static updates may occur at the beginning of the slot identified by an update timeline. In accordance with the described techniques, UE 115-a may use the beam indicated by the updates in the slot carrying the PUSCH transmission to identify the default uplink transmit beam 205 for the PUSCH transmission. Alternatively, UE 115-a may use the updated default uplink transmit beam 205 for the PUSCH transmission immediately following the slot carrying the resource used to select the updated default uplink transmit beam 205.

Aspects of the present disclosure also relate to the selection of a default uplink transmit beam 205 for SPS uplink transmission and/or grant-free operation. For example, the beam of the first uplink SPS PUSCH transmission may be based on the SPS activation grant (e.g., as for the uplink non-SPS PUSCH). For subsequent SPS PUSCH transmissions, the default uplink transmit beam 205 may be selected using any of the schemes outlined herein. In some cases, the SPS resource grant may be overridden by an explicit resource grant in the same slot (e.g., or with a grant overlapping or coinciding in time and/or frequency). Such a grant may also override the default transmit beam 205 (e.g., in accordance with the rules for non-SPS PUSCH outlined herein). In some cases, such overrides may be made persistent for future SPS occasions. For example, the persistence duration may last until the next override, may last for a fixed (e.g., configurable) duration, etc. The handling for grant-free uplink transmissions may resemble (e.g., or be identical to) the handling for SPS uplink transmissions. The difference between the two may be that the SPS uplink resources always carry transmissions (e.g., for voice communications) while the grant-free transmission resources may be available but only used if there is data to transmit. Thus the beam selection may resemble that of SPS, but the default transmit beam 205 may go unused if there is no data to send.

Aspects of the present disclosure also relate to beam selection during or after random access channel (RACH) transmissions. For example, the RACH procedure may use a single beam. UE 115-a may select a suitable beam among the synchronization signal (SS) beams used for all RACH messages (e.g., including ACK for message 4 (Msg4-ACK)). After Msg4-ACK, the selected suitable beam may continue to be used as the default uplink transmit beam 205 until other resources (e.g., PDCCH control resource sets, PUCCH resources, SRS, CSI-RS) are RRC configured. For example, the RRC configuration may include TCI states (e.g., beams). After this configuration, the schemes described herein may be applied. In some cases, the PDCCH control resource set scheme may apply during (e.g., and immediately after) RACH, with the understanding that the remaining minimum system information (RMSI) control resource set corresponding to the suitable SS beam that UE 115-a chose for RACH is the only configured control resource set during this time. During RRC configuration, if non-fallback DCI including beam indication fields (e.g., TCI for downlink grants and SRI for uplink grants) is used, these fields may be set to default values, may be set to convey some other information, or may be ignored.

For UEs 115 with uplink/downlink beam correspondence, the suitable SS beam identified may be used as default beam for both uplink and downlink transmissions until a subsequent RRC configuration (e.g., including control resource sets, TCI states, etc.) is received. For UEs 115 without uplink/downlink beam correspondence, the default beam for uplink transmissions may be the beam used to send uplink RACH messages (e.g., msg1, msg3, both) that resulted in a successful completion of RACH procedure. While msg1 may be sent on a resource that is associated with the identified suitable SS beam, the msg1 beam itself may be derived from this SS beam only for UEs 115 with uplink/downlink beam correspondence and may be a different beam for UEs 115 without this correspondence. Further, if beam training is allowed during the RACH procedure, then the default beam used after the RACH procedure and prior to receipt of a subsequent RRC configuration may be the beam identified as a result of this beam training. A separate default beam may be identified in this manner for uplink and downlink transmissions.

In cases in which SRS is not configured, the techniques described herein (e.g., allowing for selection of the default uplink transmit beam 205 without SRS) may allow the SRI field to be dropped from the DCI transmissions (e.g., which may reduce signaling overhead). Codebook-based precoding may not be supported in some such cases (e.g., because the precoder operates on SRS ports, which would not be specified in the case of uplink beam assignment without SRS configuration).

Figure 3:
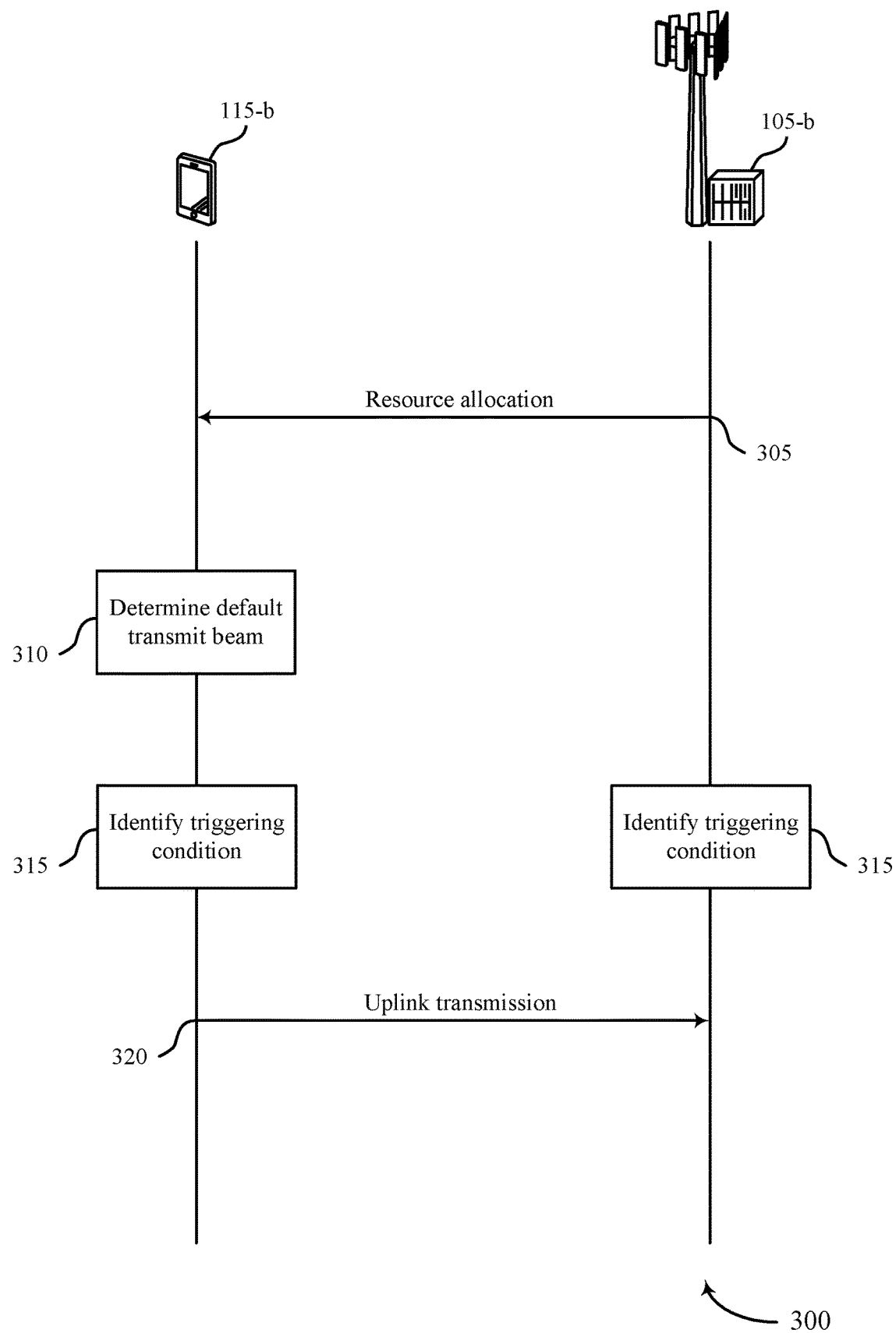
FIG. 3 illustrates an example of a process flow that supports uplink beam assignment in accordance with aspects of the present disclosure.

FIG. 3 illustrates an example of a process flow 300 that supports uplink beam assignment in accordance with aspects of the present disclosure. In some examples, process flow 300 may implement aspects of wireless communications system 100. Process flow 300 includes UE 115-b and base station 105-b, each of which may be an example of the corresponding devices described with reference to FIG. 1.

At 305, base station 105-b may allocate communication resources for UE 115-b. In various examples, the allocated communication resources may include PDSCH, PDCCH, PUSCH, or PUCCH resources as described with reference to FIG. 2. For example, base station 105-b may configure, for UE 115-b, a RMSI control resource set.

At 310, UE 115—may determine, based on the allocated communication resources, a default transmit beam for communicating with base station 105-b. For example, determining the default transmit beam may include identifying a receive beam used to receive a RMSI control resource set, the RMSI control resource set including the allocated communication resources, and selecting, prior to a completion of an RRC, the default transmit beam based on the receive beam. In some cases, determining the default transmit beam may include receiving a downlink transmission from base station 105-b over the allocated communication resources using a downlink receive beam and determining the default transmit beam based on the downlink receive beam. For example, the downlink transmission may include a PDCCH transmission and the allocated communication resources may include a PDCCH control resource set. In some cases, UE 115-b (e.g., and base station 105-b) may identify the PDCCH control resource set from a set of candidate PDCCH control resource sets based on an index associated with the PDCCH control resource set.

Additionally or alternatively, UE 115-b (e.g., and base station 105-b) may identify the PDCCH control resource set from a set of candidate PDCCH control resource sets based on a reception time at UE 115-b associated with the PDCCH control resource set. For example, UE 115-b may select, based on an index associated with the PDCCH control resource set, the PDCCH control resource set from the set of candidate PDCCH control resource sets, where the set of candidate PDCCH control resource sets are associated with a same reception time at UE 115-b. In other examples, receiving the downlink transmission may include receiving one or more CSI-RS over the allocated communication resources, where each CSI-RS is received using a respective downlink receive beam, identifying a given downlink receive beam of the one or more downlink receive beams, and determining the default transmit beam based on the given downlink receive beam. In some cases, the downlink transmission includes a PDSCH transmission. In some cases, UE 115-b may identify the downlink transmission to be used for determining the default transmit beam from a set of candidate downlink transmissions based on a scheduling parameter of the downlink transmission, a number of beams associated with the downlink transmission, a selection indication received from the base station 105, or a combination thereof.

In some cases, UE 115-b may receive a semi-static configuration (or a dynamic configuration) for the allocated communication resources, where the allocated communication resources are designated for carrying a first uplink transmission to the base station 105 using a first uplink transmit beam and determine the default transmit beam based on the first uplink transmit beam. In some cases, the first uplink transmission includes a PUCCH transmission and the allocated communication resources include a PUCCH resource. For example, UE 115-b (e.g., and base station 105-b) may identify the PUCCH resource from a set of candidate PUCCH resources based on an index associated with the PUCCH resource, an intended use of the PUCCH resource, or a combination thereof. For example, UE 115-b may identify the PUCCH resource from the set of candidate PUCCH resources based on the identified PUCCH resource having the lowest index. In some cases, the intended use of the PUCCH resource includes one of an SR, a CQI report, or a beam failure recovery. In some cases, the first uplink transmission includes an SRS transmission, a PUSCH transmission scheduled by an uplink grant that includes a PUSCH beam indicator, a SPS transmission, or a grant-free uplink transmission. In some examples, UE 115-b (e.g., and base station 105-b) may identify the first uplink transmission to be used for determining the default transmit beam from a set of candidate uplink transmissions based on a scheduling parameter of the first uplink transmission, a number of beams associated with the first uplink transmission, a selection indication received from the base station 105, or a combination thereof. In some cases, UE 115-b may identify a communication beam corresponding to a recent transmission, the recent transmission including a recent uplink transmission or a recent downlink transmission and determine the default transmit beam based on the communication beam.

At 315, UE 115-b and base station 105-b may identify a triggering condition for using the default transmit beam. In some cases, identifying the triggering condition includes receiving, from base station 105-b, an uplink grant that does not contain a PUSCH beam indicator (e.g., an SRI and/or TCI). In some cases, identifying the triggering condition includes identifying (by UE 115-b) uplink data to be transmitted to the base station 105 in an uplink communication and determining that base station 105-b has not transmitted a PUSCH beam indicator indicating a configured uplink transmit beam for the uplink communication. In some cases, identifying the triggering condition includes identifying a threshold time period preceding the uplink communication and determining that base station 105-b has not transmitted a PUSCH beam indicator indicating a configured uplink transmit beam for the uplink communication prior to the threshold time period. In some cases, the threshold time period is based on a beam-switching capability of UE 115-b.

At 320, UE 115-b may transmit an uplink communication to base station 105-b using the default transmit beam based on the triggering condition. In some cases, transmitting the uplink communication includes receiving, from base station 105-b, an update to the allocated communication resources and determining a second default transmit beam based on the update, where the uplink transmission is transmitted using the second default transmit beam.

Figure 4:
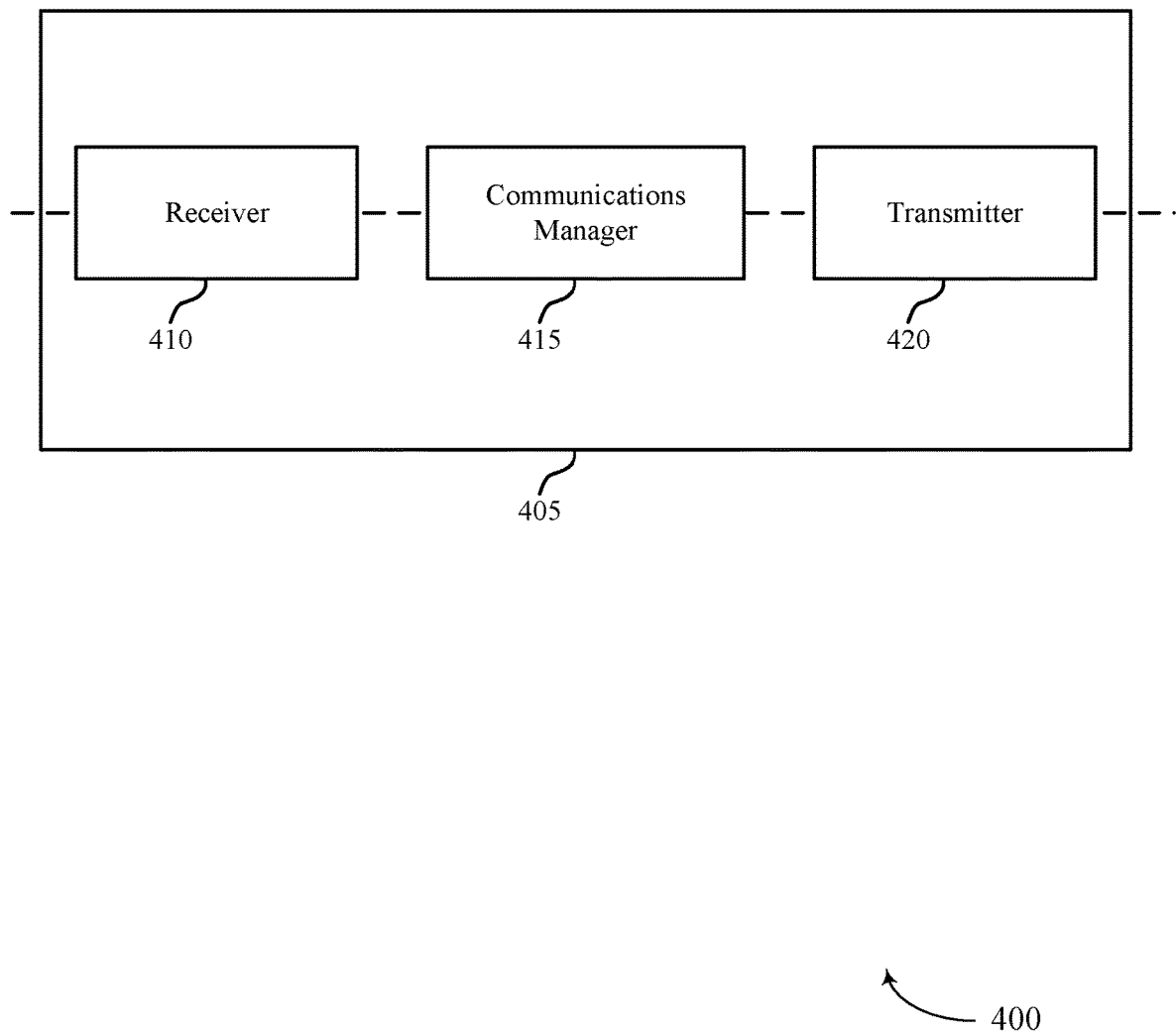
FIGS. 4 and 5 show block diagrams of devices that supports uplink beam assignment in accordance with aspects of the present disclosure.

FIG. 4 shows a block diagram 400 of a device 405 that supports uplink beam assignment in accordance with aspects of the present disclosure. The device 405 may be an example of aspects of a UE 115 as described herein. The device 405 may include receiver 410, communications manager 415, and transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to uplink beam assignment, etc.).

Information may be passed on to other components of the device. The receiver 410 may be an example of aspects of the transceiver 720 described with reference to FIG. 7. The receiver 410 may utilize a single antenna or a set of antennas.

The communications manager 415 may be an example of aspects of the communications manager 710 described with reference to FIG. 7. The communications manager 415 or its sub-components, may be implemented in hardware, code (e.g., software or firmware) executed by a processor, or any combination thereof. If implemented in code executed by a processor, the functions of the communications manager 415 and/or at least some of its various sub-components may be executed by a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described in the present disclosure.

The communications manager 415 or its sub-components, may be physically located at various positions, including being distributed such that portions of functions are implemented at different physical locations by one or more physical devices. In some examples, the communications manager 415 or its sub-components may be a separate and distinct component in accordance with various aspects of the present disclosure. In some examples, the communications manager 415 or its sub-components may be combined with one or more other hardware components, including but not limited to an input/output (I/O) component, a transceiver, a network server, another computing device, one or more other components described in the present disclosure, or a combination thereof in accordance with various aspects of the present disclosure.

The communications manager 415 may determine, based on communication resources allocated by a base station 105, a default transmit beam for communicating with the base station 105. The communications manager 415 may identify a triggering condition for using the default transmit beam. The communications manager 415 may transmit an uplink communication to the base station 105 using the default transmit beam based on the triggering condition.

The transmitter 420 may transmit signals generated by other components of the device. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas.

Figure 5:
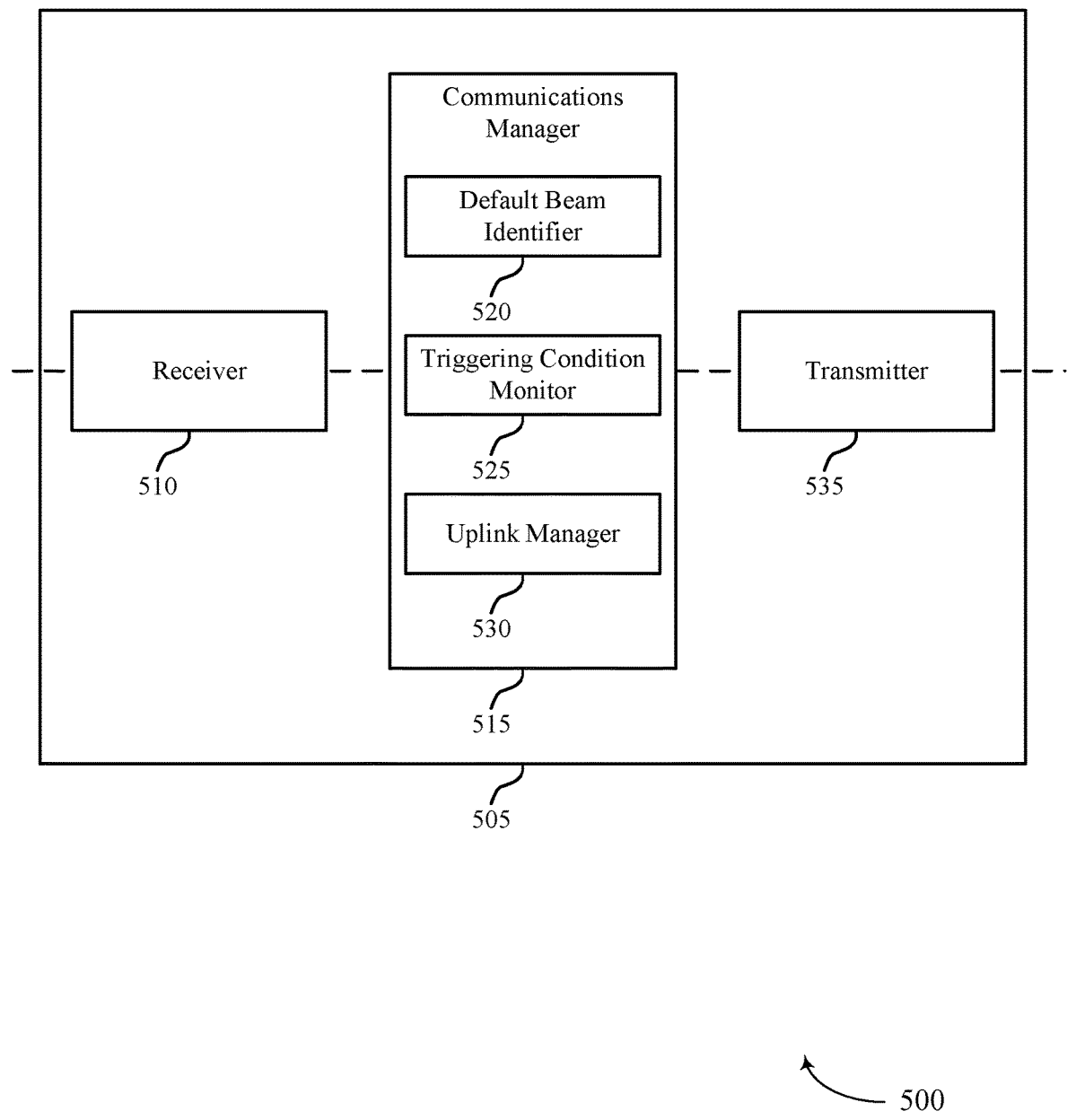

FIG. 5 shows a block diagram 500 of a device 505 that supports uplink beam assignment in accordance with aspects of the present disclosure. The device 505 may be an example of aspects of a device 405 or a UE 115 as described with reference to FIGS. 1 and 4. The device 505 may include receiver 510, communications manager 515, and transmitter 535. The device 505 may also include a processor. Each of these components may be in communication with one another (e.g., via one or more buses). The communications manager 515 may also include default beam identifier 520, triggering condition monitor 525, and uplink manager 530. The communications manager 515 may be an example of aspects of the communications manager 710 described with reference to FIG. 7.

The receiver 510 may receive information such as packets, user data, or control information associated with various information channels (e.g., control channels, data channels, and information related to uplink beam assignment, etc.). Information may be passed on to other components of the device. The receiver 510 may be an example of aspects of the transceiver 720 described with reference to FIG. 7. The receiver 510 may utilize a single antenna or a set of antennas.

The default beam identifier 520 may determine, based on communication resources allocated by a base station 105, a default transmit beam for communicating with the base station 105. The triggering condition monitor 525 may identify a triggering condition for using the default transmit beam. The uplink manager 530 may transmit an uplink communication to the base station 105 using the default transmit beam based on the triggering condition.

The transmitter 535 may transmit signals generated by other components of the device. In some examples, the transmitter 535 may be collocated with a receiver 510 in a transceiver module. For example, the transmitter 535 may be an example of aspects of the transceiver 720 described with reference to FIG. 7. The transmitter 535 may utilize a single antenna or a set of antennas.

Figure 6:
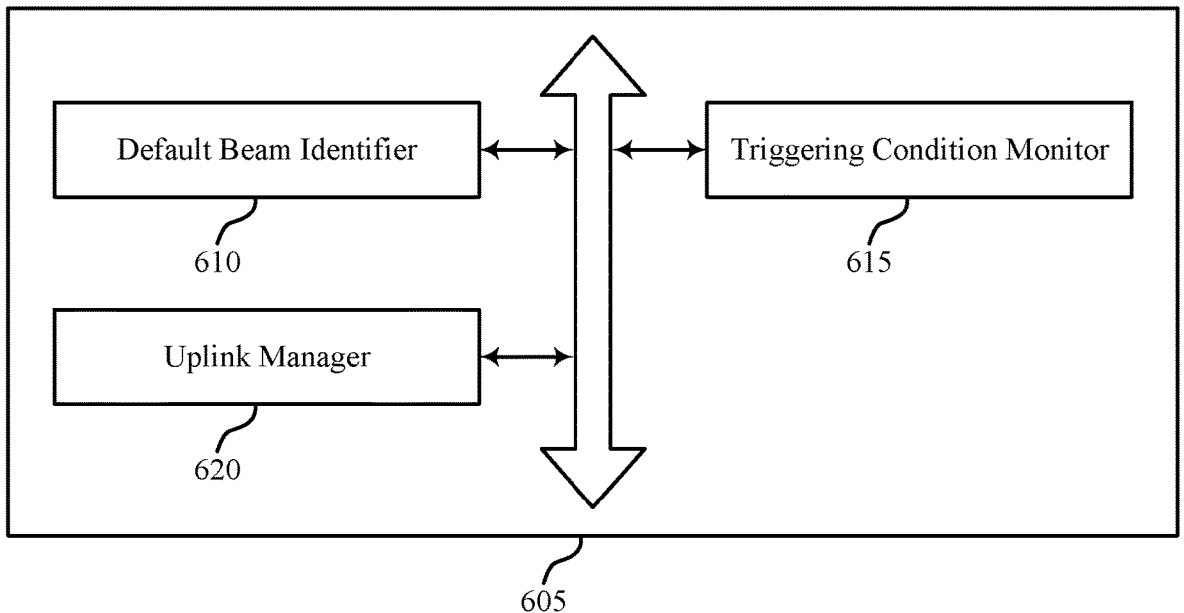
FIG. 6 show a block diagram of a device that supports uplink beam assignment in accordance with aspects of the present disclosure.

FIG. 6 shows a block diagram 600 of a communications manager 605 that supports uplink beam assignment in accordance with aspects of the present disclosure. The communications manager 605 may be an example of aspects of a communications manager 415, a communications manager 515, or a communications manager 710 described with reference to FIGS. 4, 5, and 7. The communications manager 605 may include default beam identifier 610, triggering condition monitor 615, and uplink manager 620. Each of these modules may communicate, directly or indirectly, with one another (e.g., via one or more buses).

The default beam identifier 610 may determine, based on communication resources allocated by a base station 105, a default transmit beam for communicating with the base station 105. In some examples, identifying a receive beam used to receive a RMSI control resource set, where the RMSI control resource set includes the allocated communication resources. In some examples, the default beam identifier 610 may select, prior to a completion of an RRC configuration, the default transmit beam based on the receive beam. In some examples, the default beam identifier 610 may receive a downlink transmission from the base station 105 over the allocated communication resources using a downlink receive beam. In some examples, the default beam identifier 610 may determine the default transmit beam based on the downlink receive beam.

In some examples, the default beam identifier 610 may identify the PDCCH control resource set from a set of candidate PDCCH control resource sets based on an index associated with the PDCCH control resource set. In some examples, the default beam identifier 610 may identify the PDCCH control resource set from a set of candidate PDCCH control resource sets based on a reception time at the UE 115 associated with the PDCCH control resource set. In some examples, the default beam identifier 610 may select, based on an index associated with the PDCCH control resource set, the PDCCH control resource set from the set of candidate PDCCH control resource sets, where the set of candidate PDCCH control resource sets are associated with a same reception time at the UE 115. In some examples, the default beam identifier 610 may receive one or more CSI-RS over the allocated communication resources, where each CSI-RS is received using a respective downlink receive beam. In some examples, the default beam identifier 610 may identify a given downlink receive beam of the one or more downlink receive beams.

In some examples, the default beam identifier 610 may determine the default transmit beam based on the given downlink receive beam. In some examples, the default beam identifier 610 may identify the downlink transmission to be used for determining the default transmit beam from a set of candidate downlink transmissions based on a scheduling parameter of the downlink transmission, a number of beams associated with the downlink transmission, a selection indication received from the base station 105, or a combination thereof. In some examples, the default beam identifier 610 may receive a semi-static configuration or a dynamic configuration for the allocated communication resources, where the allocated communication resources are designated for carrying a first uplink transmission to the base station 105 using a first uplink transmit beam. In some examples, the default beam identifier 610 may determine the default transmit beam based on the first uplink transmit beam.

In some examples, the default beam identifier 610 may identify the PUCCH resource from a set of candidate PUCCH resources based on an index associated with the PUCCH resource, an intended use of the PUCCH resource, or a combination thereof. In some examples, the default beam identifier 610 may identify the first uplink transmission to be used for determining the default transmit beam from a set of candidate uplink transmissions based on a scheduling parameter of the first uplink transmission, a number of beams associated with the first uplink transmission, a selection indication received from the base station 105, or a combination thereof. In some examples, the default beam identifier 610 may identify a communication beam corresponding to a recent transmission, the recent transmission including a recent uplink transmission or a recent downlink transmission. In some examples, the default beam identifier 610 may determine the default transmit beam based on the communication beam. In some examples, the default beam identifier 610 may receive, from the base station 105, an update to the allocated communication resources. In some examples, the default beam identifier 610 may determine a second default transmit beam based on the update, where the uplink transmission is transmitted using the second default transmit beam. In some cases, the downlink transmission includes a PDCCH transmission and the allocated communication resources include a PDCCH control resource set. In some cases, the downlink transmission includes a PDSCH transmission. In some cases, the first uplink transmission includes a PUCCH transmission and the allocated communication resources include a PUCCH resource. In some cases, the intended use of the PUCCH resource includes one of an SR, a CQI report, or a beam failure recovery. In some cases, the first uplink transmission includes an SRS transmission, a PUSCH transmission scheduled by an uplink grant that includes a PUSCH beam indicator, a SPS transmission, or a grant-free uplink transmission.

The triggering condition monitor 615 may identify a triggering condition for using the default transmit beam. In some examples, the triggering condition monitor 615 may receive, from the base station 105, an uplink grant that does not contain a PUSCH beam indicator. In some examples, the triggering condition monitor 615 may identify uplink data to be transmitted to the base station 105 in the uplink communication. In some examples, the triggering condition monitor 615 may determine that the base station 105 has not transmitted a PUSCH beam indicator indicating a configured uplink transmit beam for the uplink communication. In some examples, the triggering condition monitor 615 may identify a threshold time period preceding the uplink communication. In some examples, the triggering condition monitor 615 may determine that the base station 105 has not transmitted a PUSCH beam indicator indicating a configured uplink transmit beam for the uplink communication prior to the threshold time period. In some cases, the PUSCH beam indicator includes an SRI or a TCI. In some cases, the threshold time period is based on a beam-switching capability of the UE 115.

The uplink manager 620 may transmit an uplink communication to the base station 105 using the default transmit beam based on the triggering condition.

Figure 7:
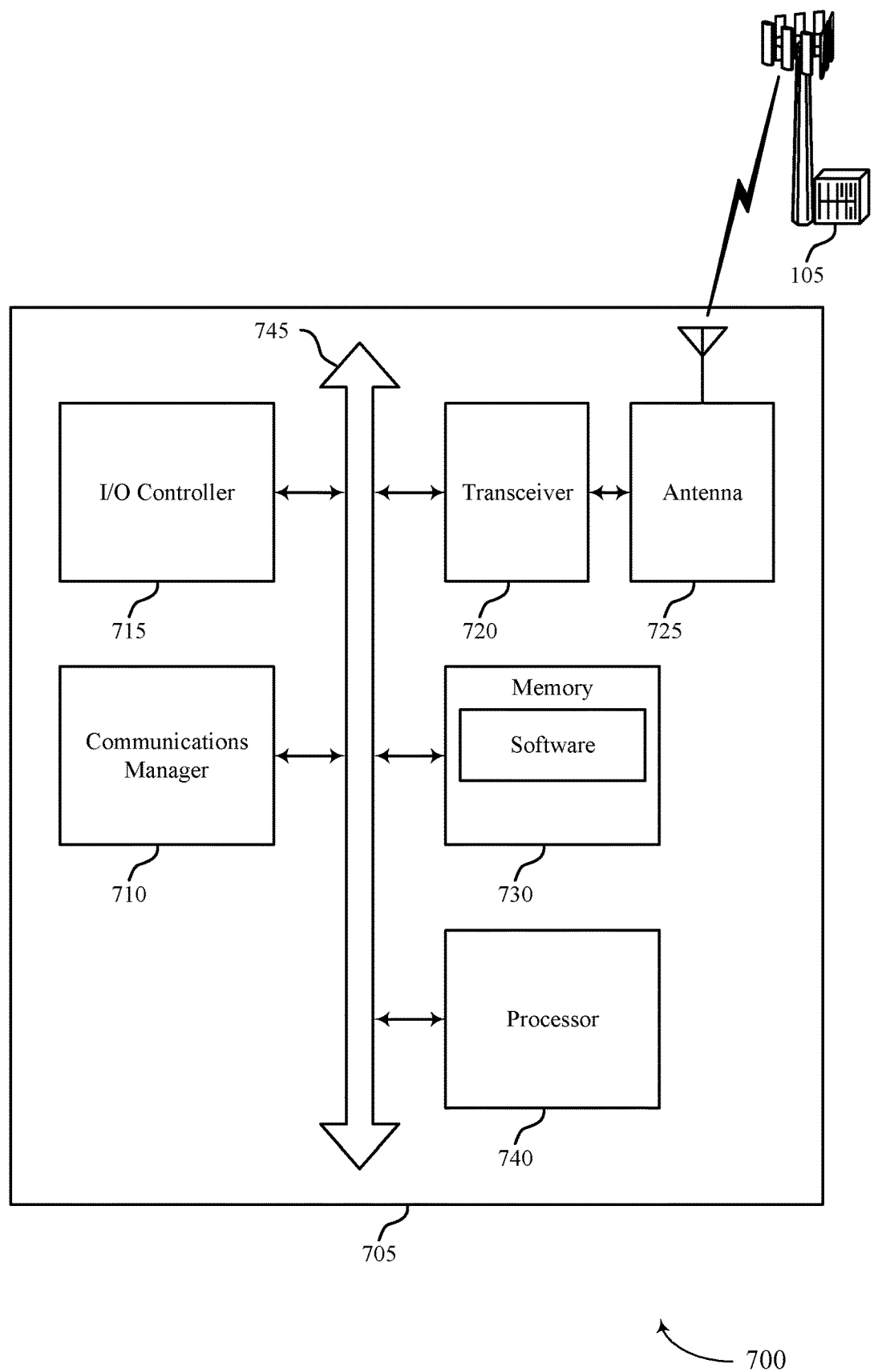
FIG. 7 illustrates a block diagram of a system including a device that supports uplink beam assignment in accordance with aspects of the present disclosure.

FIG. 7 illustrates a block diagram of a system 700 including a device 705 that supports uplink beam assignment in accordance with aspects of the present disclosure. The device 705 may be an example of or include the components of device 405, device 505, or a UE 115 as described herein, e.g., with reference to FIGS. 4 and 5. The device 705 may include components for bi-directional voice and data communications including components for transmitting and receiving communications, including communications manager 710, I/O controller 715, transceiver 720, antenna 725, memory 730, and processor 740. These components may be in electronic communication via one or more buses (e.g., bus 745).

The I/O controller 715 may manage input and output signals for device 705. The I/O controller 715 may also manage peripherals not integrated into device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with device 705 via the I/O controller 715 or via hardware components controlled by the I/O controller 715.

The transceiver 720 may communicate bi-directionally, via one or more antennas, wired, or wireless links as described herein. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas. In some cases, the wireless device may include a single antenna 725. However, in some cases the device may have more than one antenna 725, which may be capable of concurrently transmitting or receiving multiple wireless transmissions.

The memory 730 may include random access memory (RAM) and read only memory (ROM). The memory 730 may store computer-readable, computer-executable software 735 including instructions that, when executed, cause the processor to perform various functions described herein. In some cases, the memory 730 may contain, among other things, a basic I/O system (BIOS) which may control basic hardware or software operation such as the interaction with peripheral components or devices.

The processor 740 may include an intelligent hardware device, (e.g., a general-purpose processor, a DSP, a CPU, a microcontroller, an ASIC, an FPGA, a PLD, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory to perform various functions (e.g., functions or tasks supporting uplink beam assignment).

Figure 8:
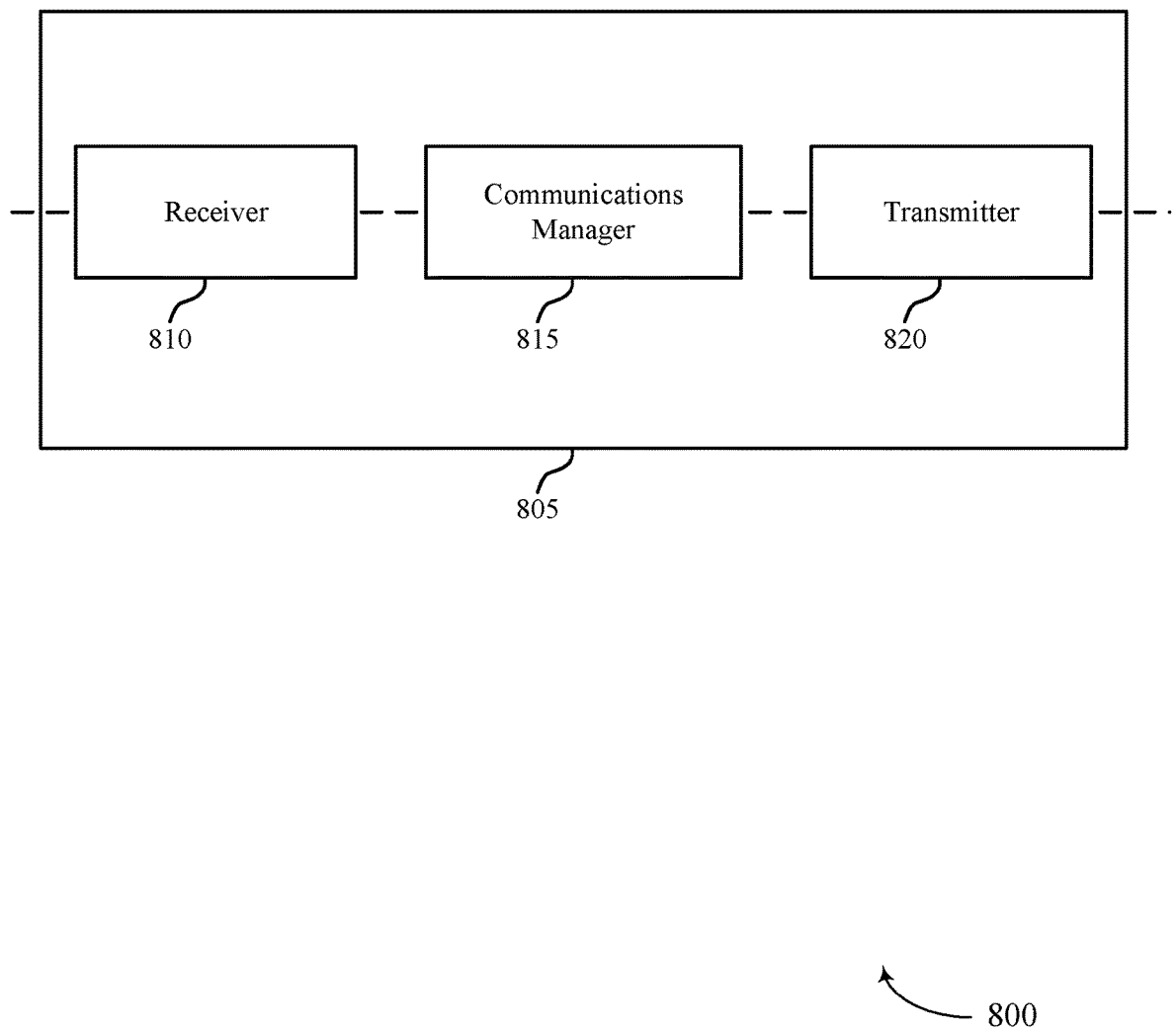
FIGS. 8 and 9 show block diagrams of devices that supports uplink beam assignment in accordance with aspects of the present disclosure.

FIG. 8 shows a block diagram 800 of a device 805 that supports uplink beam assignment in accordance with aspects of the present disclosure. The device 805 may be an example of aspects of a base station 105 as described herein. The device 805 may include receiver 810, communications manager 815, and transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to uplink beam assignment, etc.). Information may be passed on to other components of the device. The receiver 810 may be an example of aspects of the transceiver 1120 described with reference to FIG. 11. The receiver 810 may utilize a single antenna or a set of antennas.

The communications manager 815 may be an example of aspects of the communications manager 1110 described with reference to FIG. 11. The communications manager 815 or its sub-components, may be implemented in hardware, code (e.g., software or firmware) executed by a processor, or any combination thereof. If implemented in code executed by a processor, the functions of the communications manager 815 and/or at least some of its various sub-components may be executed by a general-purpose processor, a DSP, an ASIC, an FPGA or other PLD, discrete gate or transistor logic, discrete hardware components, or any combination thereof designed to perform the functions described in the present disclosure.

The communications manager 815 or its sub-components, may be physically located at various positions, including being distributed such that portions of functions are implemented at different physical locations by one or more physical devices. In some examples, the communications manager 815 or its sub-components may be a separate and distinct component in accordance with various aspects of the present disclosure. In some examples, the communications manager 815 or its sub-components may be combined with one or more other hardware components, including but not limited to an I/O component, a transceiver, a network server, another computing device, one or more other components described in the present disclosure, or a combination thereof in accordance with various aspects of the present disclosure.

The communications manager 815 may allocate communication resources for a UE 115. The communications manager 815 may identify a triggering condition that indicates to the UE 115 to use a default transmit beam for communicating with the base station 105, where the default transmit beam is based on the allocated communication resources. The communications manager 815 may receive, based on the triggering condition, an uplink communication from the UE 115, where the uplink communication is transmitted by the UE 115 using the default transmit beam.

The transmitter 820 may transmit signals generated by other components of the device. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
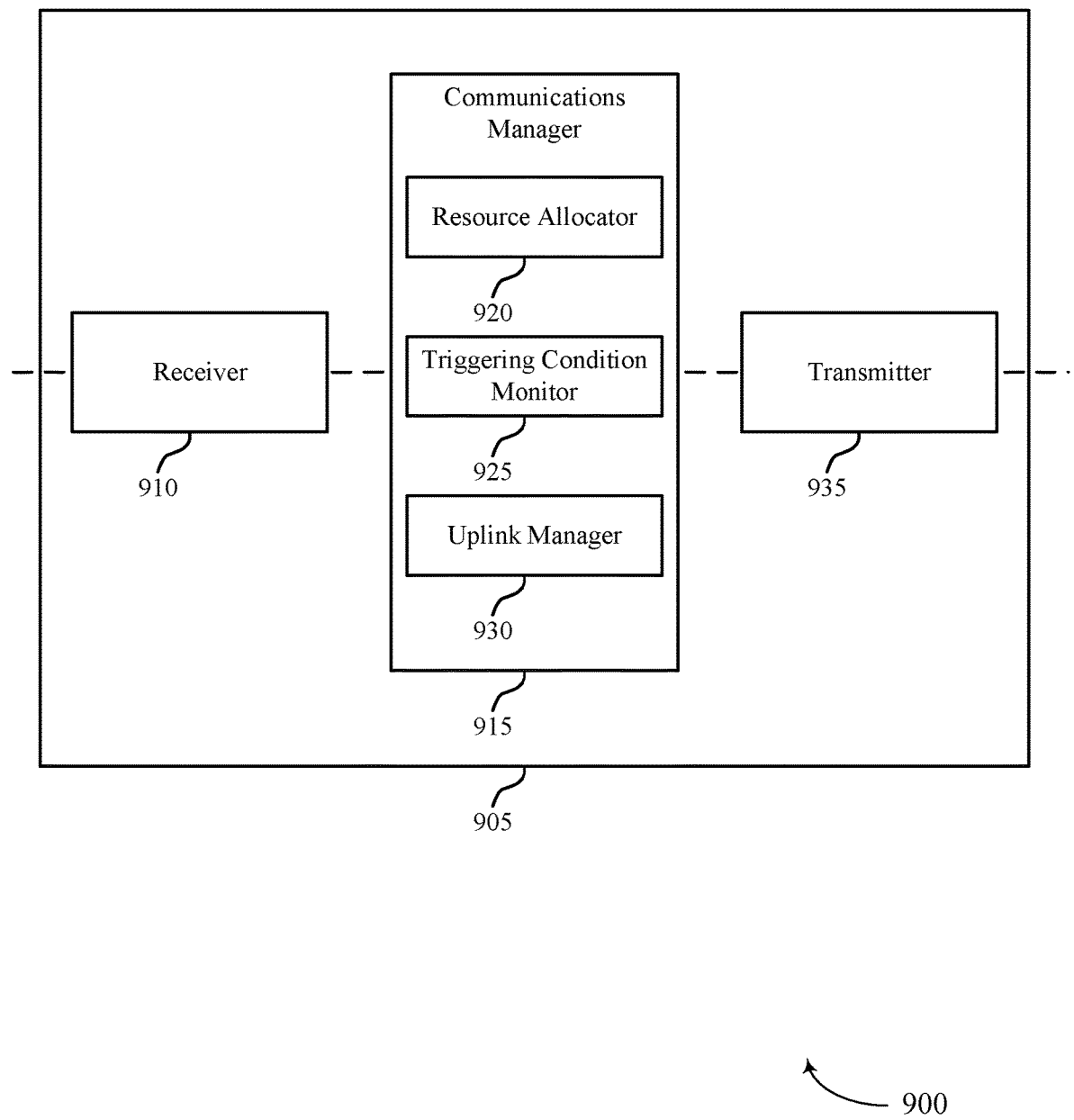

FIG. 9 shows a block diagram 900 of a device 905 that supports uplink beam assignment in accordance with aspects of the present disclosure. The device 905 may be an example of aspects of a base station 105 or a UE 115 as described with reference to FIGS. 1 and 8. The device 905 may include receiver 910, communications manager 915, and transmitter 935. The device 905 may also include a processor. Each of these components may be in communication with one another (e.g., via one or more buses). The communications manager 915 may also include resource allocator 920, triggering condition monitor 925, and uplink manager 930. The communications manager 915 may be an example of aspects of the communications manager 1110 described with reference to FIG. 11.

The receiver 910 may receive information such as packets, user data, or control information associated with various information channels (e.g., control channels, data channels, and information related to uplink beam assignment, etc.). Information may be passed on to other components of the device. The receiver 910 may be an example of aspects of the transceiver 1120 described with reference to FIG. 11. The receiver 910 may utilize a single antenna or a set of antennas.

The resource allocator 920 may allocate communication resources for a UE 115. The triggering condition monitor 925 may identify a triggering condition that indicates to the UE 115 to use a default transmit beam for communicating with the base station 105, where the default transmit beam is based on the allocated communication resources. The uplink manager 930 may receive, based on the triggering condition, an uplink communication from the UE 115, where the uplink communication is transmitted by the UE 115 using the default transmit beam.

The transmitter 935 may transmit signals generated by other components of the device. In some examples, the transmitter 935 may be collocated with a receiver 910 in a transceiver module. For example, the transmitter 935 may be an example of aspects of the transceiver 1120 described with reference to FIG. 11. The transmitter 935 may utilize a single antenna or a set of antennas.

Figure 10:
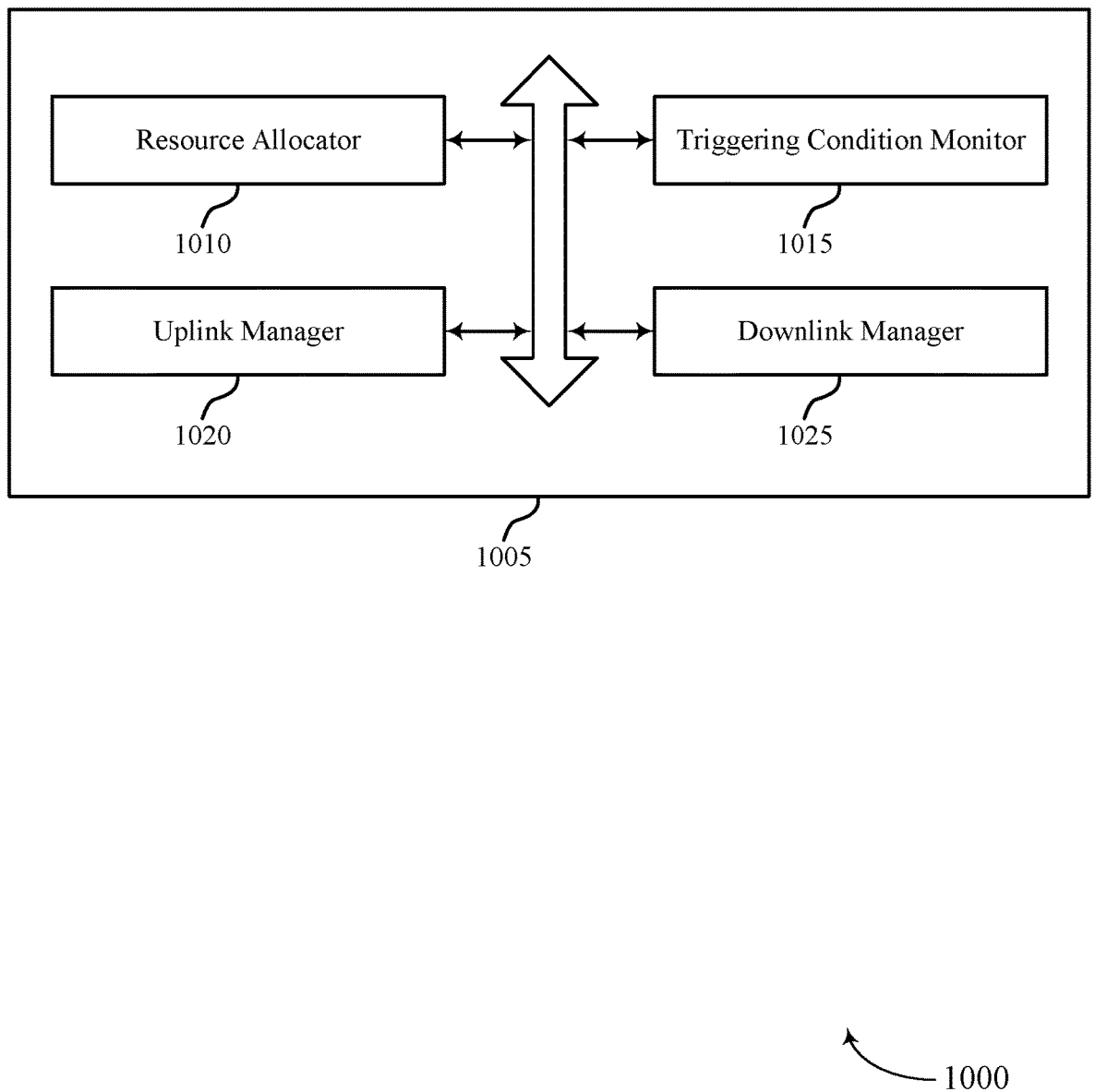
FIG. 10 show a block diagram of a device that supports uplink beam assignment in accordance with aspects of the present disclosure.

FIG. 10 shows a block diagram 1000 of a communications manager 1005 that supports uplink beam assignment in accordance with aspects of the present disclosure. The communications manager 1005 may be an example of aspects of a communications manager 815, a communications manager 915, or a communications manager 1110 described with reference to FIGS. 8, 9, and 11. The communications manager 1005 may include resource allocator 1010, triggering condition monitor 1015, uplink manager 1020, and downlink manager 1025. Each of these modules may communicate, directly or indirectly, with one another (e.g., via one or more buses).

The resource allocator 1010 may allocate communication resources for a UE 115. In some examples, the resource allocator 1010 may configure, for the UE 115, a RMSI control resource set. In some examples, the resource allocator 1010 may identify, prior to a completion of an RRC configuration, the default transmit beam based on the RMSI control resource set. In some examples, the resource allocator 1010 may transmit a semi-static configuration or a dynamic configuration allocating the communication resources, which are designated for carrying a first uplink transmission from the UE 115 to the base station 105 using a first uplink transmit beam, where the uplink communication is transmitted by the UE 115 using the default transmit beam based on the first uplink transmit beam. In some examples, the resource allocator 1010 may identify the PUCCH resource from a set of candidate PUCCH resources based on an index associated with the PUCCH resource, an intended use of the PUCCH resource, or a combination thereof.

In some examples, the resource allocator 1010 may identify the first uplink transmission to be used by the UE 115 for determining the default transmit beam from a set of candidate uplink transmissions based on a scheduling parameter of the first uplink transmission, a number of beams associated with the first uplink transmission, a selection indication transmitted by the base station 105, or a combination thereof. In some examples, the resource allocator 1010 may transmit, to the UE 115, an update to the allocated communication resources, where the uplink communication is transmitted by the UE 115 on the default transmit beam based on the update. In some cases, the first uplink transmission includes a PUCCH transmission and the allocated communication resources include a PUCCH resource. In some cases, the intended use of the PUCCH resource includes one of an SR, a CQI report, or a beam failure recovery. In some cases, the first uplink transmission includes an SRS transmission, a PUSCH transmission scheduled by an uplink grant that includes a PUSCH beam indicator, a SPS transmission, or a grant-free uplink transmission.

The triggering condition monitor 1015 may identify a triggering condition that indicates to the UE 115 to use a default transmit beam for communicating with the base station 105, where the default transmit beam is based on the allocated communication resources. In some examples, the triggering condition monitor 1015 may transmit, to the UE 115, an uplink grant that does not contain a PUSCH beam indicator. In some cases, the PUSCH beam indicator includes an SRI or a TCI.

The uplink manager 1020 may receive, based on the triggering condition, an uplink communication from the UE 115, where the uplink communication is transmitted by the UE 115 using the default transmit beam. In some examples, the uplink manager 1020 may identify a communication beam corresponding to a recent transmission, the recent transmission including a recent uplink transmission from the UE 115 or a recent downlink transmission to the UE 115, where the uplink communication is transmitted by the UE 115 using the default transmit beam based on the communication beam.

The downlink manager 1025 may transmit a downlink transmission to the UE 115 over the allocated communication resources, where the uplink communication is transmitted by the UE 115 using the default transmit beam based on the downlink transmission. In some examples, the downlink manager 1025 may identify the PDCCH control resource set from a set of candidate PDCCH control resource sets based on an index associated with the PDCCH control resource set. In some examples, the downlink manager 1025 may transmit one or more CSI-RS over the allocated communication resources, where the uplink communication is transmitted by the UE 115 using the default transmit beam based on the one or more CSI-RS. In some examples, the downlink manager 1025 may identify the downlink transmission to be used by the UE 115 for determining the default transmit beam from a set of candidate downlink transmissions based on a scheduling parameter of the downlink transmission, a number of beams associated with the downlink transmission, a selection indication received from the base station 105, or a combination thereof. In some cases, the downlink transmission includes a PDCCH transmission and the allocated communication resources include a PDCCH control resource set. In some cases, the downlink transmission includes a PDSCH transmission.

Figure 11:
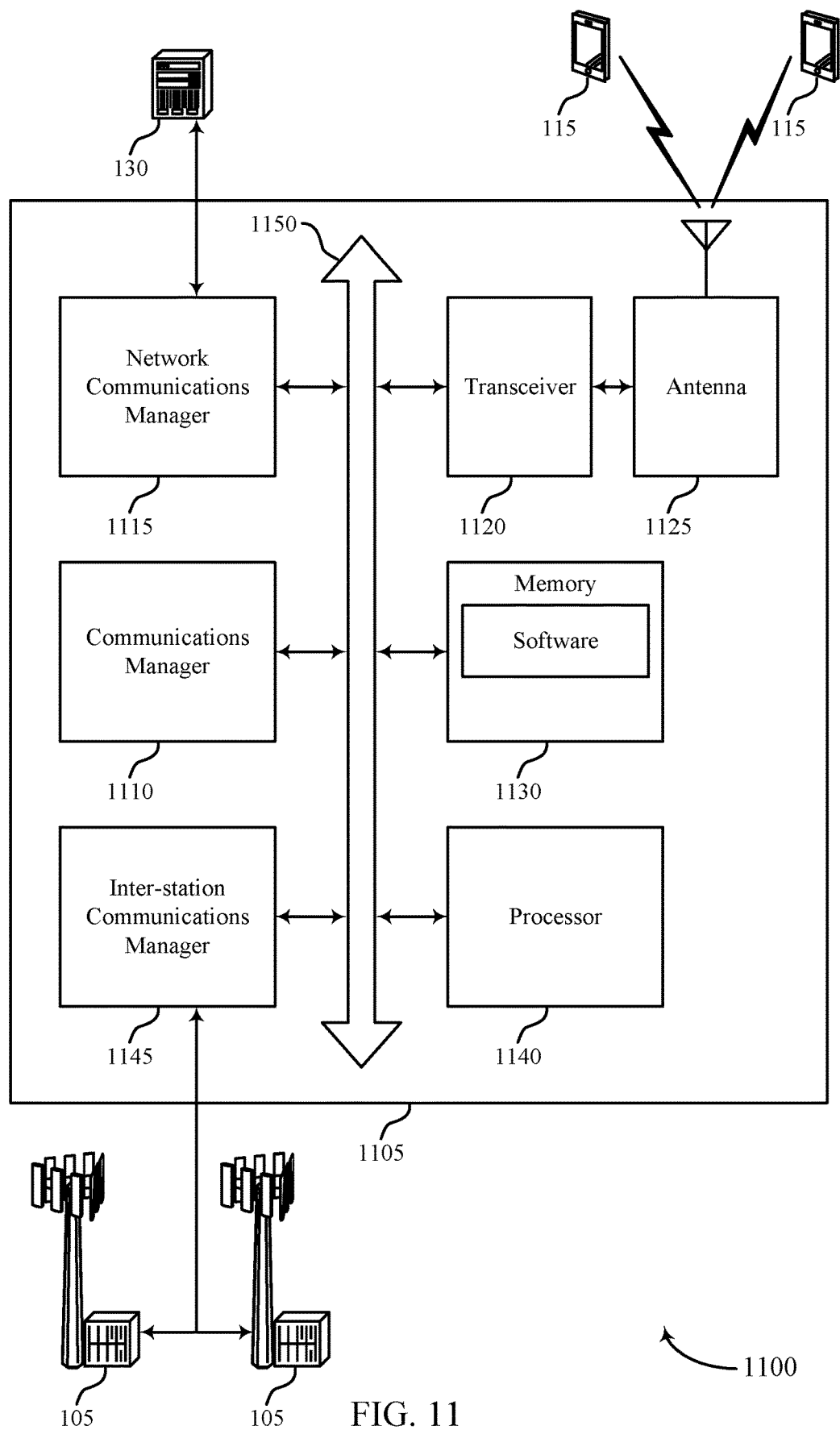
FIG. 11 illustrates a block diagram of a system including a device that supports uplink beam assignment in accordance with aspects of the present disclosure.

FIG. 11 shows a diagram of a system 1100 including a device 1105 that supports uplink beam assignment in accordance with aspects of the present disclosure. The device 1105 may be an example of or include the components of device 805, device 905, or a base station 105 as described above, e.g., with reference to FIGS. 8 and 9. The device 1105 may include components for bi-directional voice and data communications including components for transmitting and receiving communications, including communications manager 1110, network communications manager 1115, transceiver 1120, antenna 1125, memory 1130, processor 1140, and inter-station communications manager 1145. These components may be in electronic communication via one or more buses (e.g., bus 1150).

The network communications manager 1115 may manage communications with the core network (e.g., via one or more wired backhaul links). For example, the network communications manager 1115 may manage the transfer of data communications for client devices, such as one or more UEs 115.

The transceiver 1120 may communicate bi-directionally, via one or more antennas, wired, or wireless links as described herein. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas. In some cases, the wireless device may include a single antenna 1125. However, in some cases the device may have more than one antenna 1125, which may be capable of concurrently transmitting or receiving multiple wireless transmissions.

The memory 1130 may include RAM and ROM. The memory 1130 may store computer-readable, computer-executable software 1135 including instructions that, when executed, cause the processor to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a PLD, a discrete gate or transistor logic component, a discrete hardware component, or any combination thereof). In some cases, the processor 1140 may be configured to operate a memory array using a memory controller. In other cases, a memory controller may be integrated into processor 1140. The processor 1140 may be configured to execute computer-readable instructions stored in a memory to perform various functions (e.g., functions or tasks supporting uplink beam assignment).

The inter-station communications manager 1145 may manage communications with other base station 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communication network technology to provide communication between base stations 105.

Figure 12:
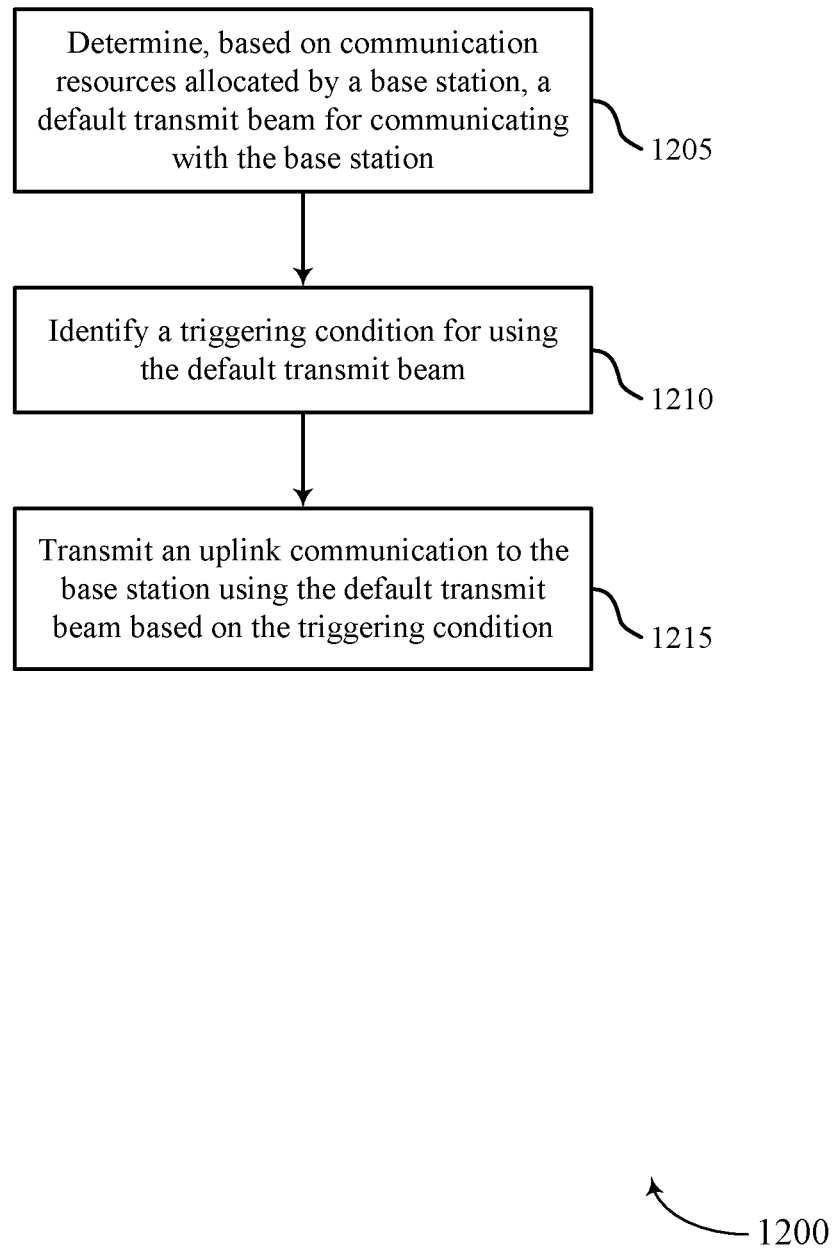
FIGS. 12 through 17 show flowcharts illustrating methods for uplink beam assignment in accordance with aspects of the present disclosure.

FIG. 12 shows a flowchart illustrating a method 1200 for uplink beam assignment in accordance with aspects of the present disclosure. The operations of method 1200 may be implemented by a UE 115 or its components as described herein. For example, the operations of method 1200 may be performed by a communications manager as described with reference to FIGS. 4 to 7. In some examples, a UE 115 may execute a set of codes to control the functional elements of the device to perform the functions described herein. Additionally or alternatively, the UE 115 may perform aspects of the functions described herein using special-purpose hardware.

At 1205 the UE 115 may determine, based on communication resources allocated by a base station 105, a default transmit beam for communicating with the base station 105. The operations of 1205 may be performed according to the methods described herein. In certain examples, aspects of the operations of 1205 may be performed by a default beam identifier as described with reference to FIGS. 4 to 7.

At 1210 the UE 115 may identify a triggering condition for using the default transmit beam. The operations of 1210 may be performed according to the methods described herein. In certain examples, aspects of the operations of 1210 may be performed by a triggering condition monitor as described with reference to FIGS. 4 to 7.

At 1215 the UE 115 may transmit an uplink communication to the base station 105 using the default transmit beam based on the triggering condition. The operations of 1215 may be performed according to the methods described herein. In certain examples, aspects of the operations of 1215 may be performed by an uplink manager as described with reference to FIGS. 4 to 7.

Figure 13:
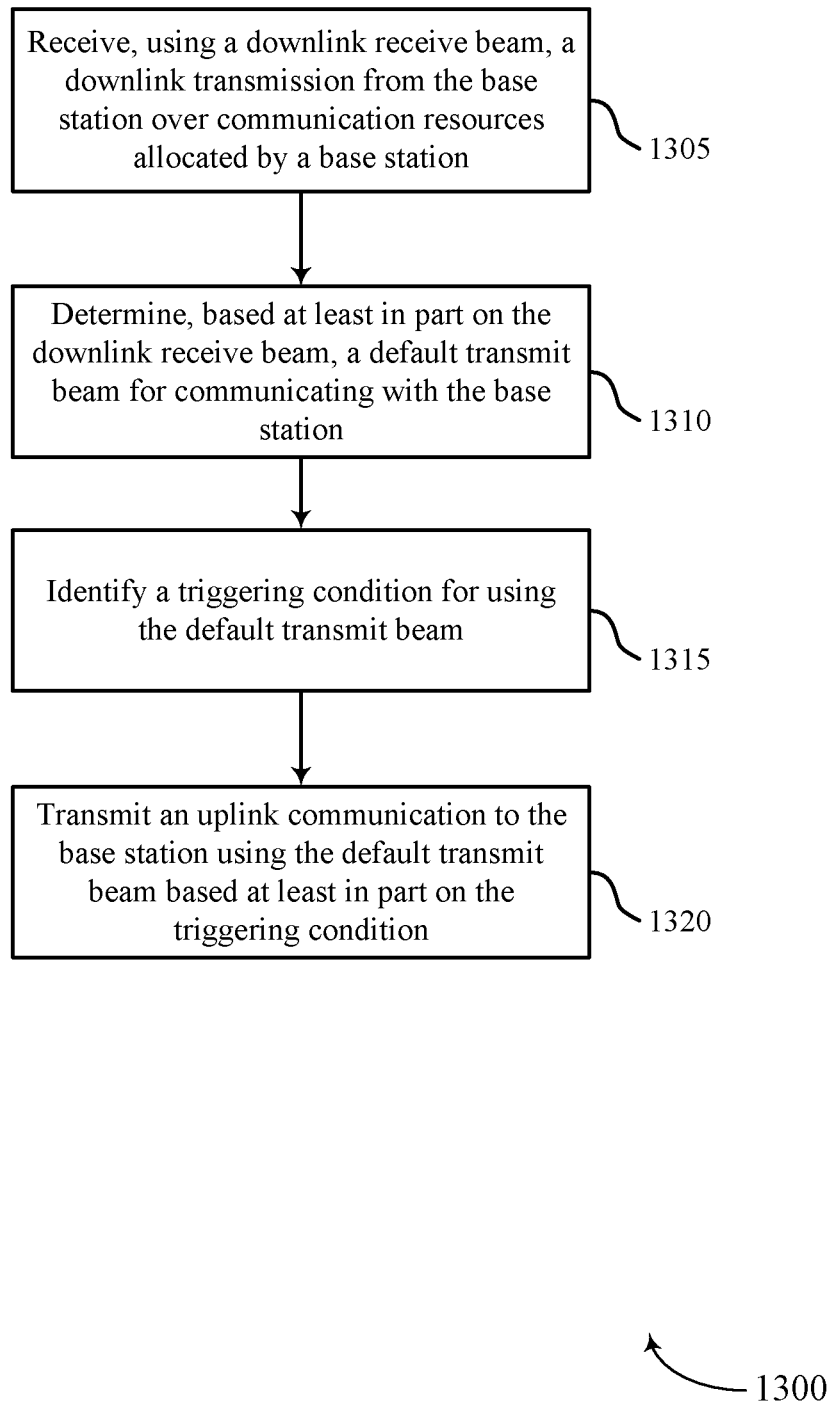

FIG. 13 shows a flowchart illustrating a method 1300 for uplink beam assignment in accordance with aspects of the present disclosure. The operations of method 1300 may be implemented by a UE 115 or its components as described herein. For example, the operations of method 1300 may be performed by a communications manager as described with reference to FIGS. 4 to 7. In some examples, a UE 115 may execute a set of codes to control the functional elements of the device to perform the functions described herein. Additionally or alternatively, the UE 115 may perform aspects of the functions described herein using special-purpose hardware.

At 1305 the UE 115 may receive, using a downlink receive beam, a downlink transmission from the base station 105 over communication resources allocated by a base station 105. The operations of 1305 may be performed according to the methods described herein. In certain examples, aspects of the operations of 1305 may be performed by a default beam identifier as described with reference to FIGS. 4 to 7.

At 1310 the UE 115 may determine, based on the downlink receive beam, a default transmit beam for communicating with the base station 105. The operations of 1310 may be performed according to the methods described herein. In certain examples, aspects of the operations of 1310 may be performed by a default beam identifier as described with reference to FIGS. 4 to 7.

At 1315 the UE 115 may identify a triggering condition for using the default transmit beam. The operations of 1315 may be performed according to the methods described herein. In certain examples, aspects of the operations of 1315 may be performed by a triggering condition monitor as described with reference to FIGS. 4 to 7.

At 1320 the UE 115 may transmit an uplink communication to the base station 105 using the default transmit beam based on the triggering condition. The operations of 1320 may be performed according to the methods described herein. In certain examples, aspects of the operations of 1320 may be performed by an uplink manager as described with reference to FIGS. 4 to 7.

Figure 14:
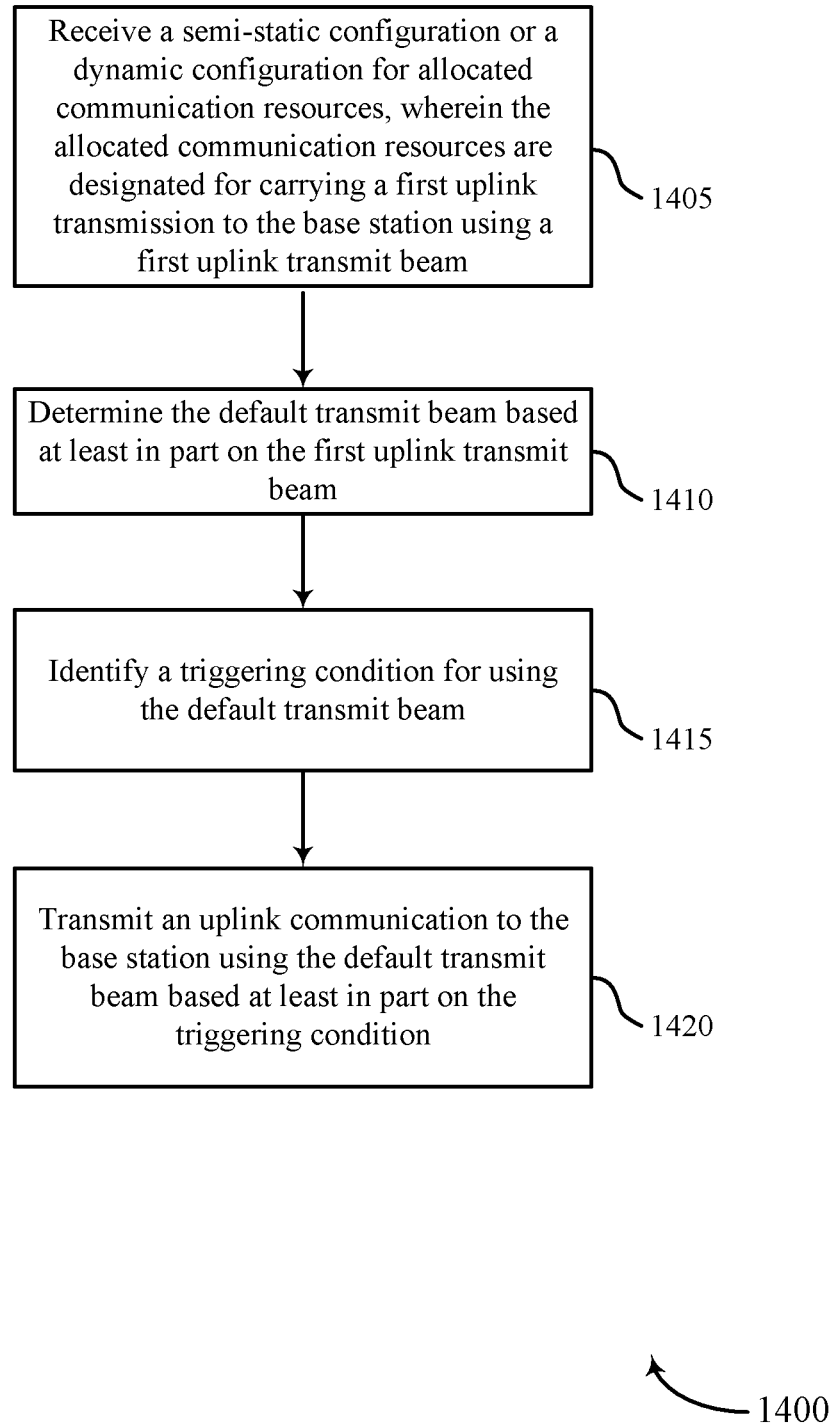

FIG. 14 shows a flowchart illustrating a method 1400 for uplink beam assignment in accordance with aspects of the present disclosure. The operations of method 1400 may be implemented by a UE 115 or its components as described herein. For example, the operations of method 1400 may be performed by a communications manager as described with reference to FIGS. 4 to 7. In some examples, a UE 115 may execute a set of codes to control the functional elements of the device to perform the functions described herein. Additionally or alternatively, the UE 115 may perform aspects of the functions described herein using special-purpose hardware.

At 1405 the UE 115 may receive a semi-static configuration or a dynamic configuration for allocated communication resources, where the allocated communication resources are designated for carrying a first uplink transmission to the base station 105 using a first uplink transmit beam. The operations of 1405 may be performed according to the methods described herein. In certain examples, aspects of the operations of 1405 may be performed by a default beam identifier as described with reference to FIGS. 4 to 7.

At 1410 the UE 115 may determine the default transmit beam based on the first uplink transmit beam. The operations of 1410 may be performed according to the methods described herein. In certain examples, aspects of the operations of 1410 may be performed by a default beam identifier as described with reference to FIGS. 4 to 7.

At 1415 the UE 115 may identify a triggering condition for using the default transmit beam. The operations of 1415 may be performed according to the methods described herein. In certain examples, aspects of the operations of 1415 may be performed by a triggering condition monitor as described with reference to FIGS. 4 to 7.

At 1420 the UE 115 may transmit an uplink communication to the base station 105 using the default transmit beam based on the triggering condition. The operations of 1420 may be performed according to the methods described herein. In certain examples, aspects of the operations of 1420 may be performed by an uplink manager as described with reference to FIGS. 4 to 7.

Figure 15:
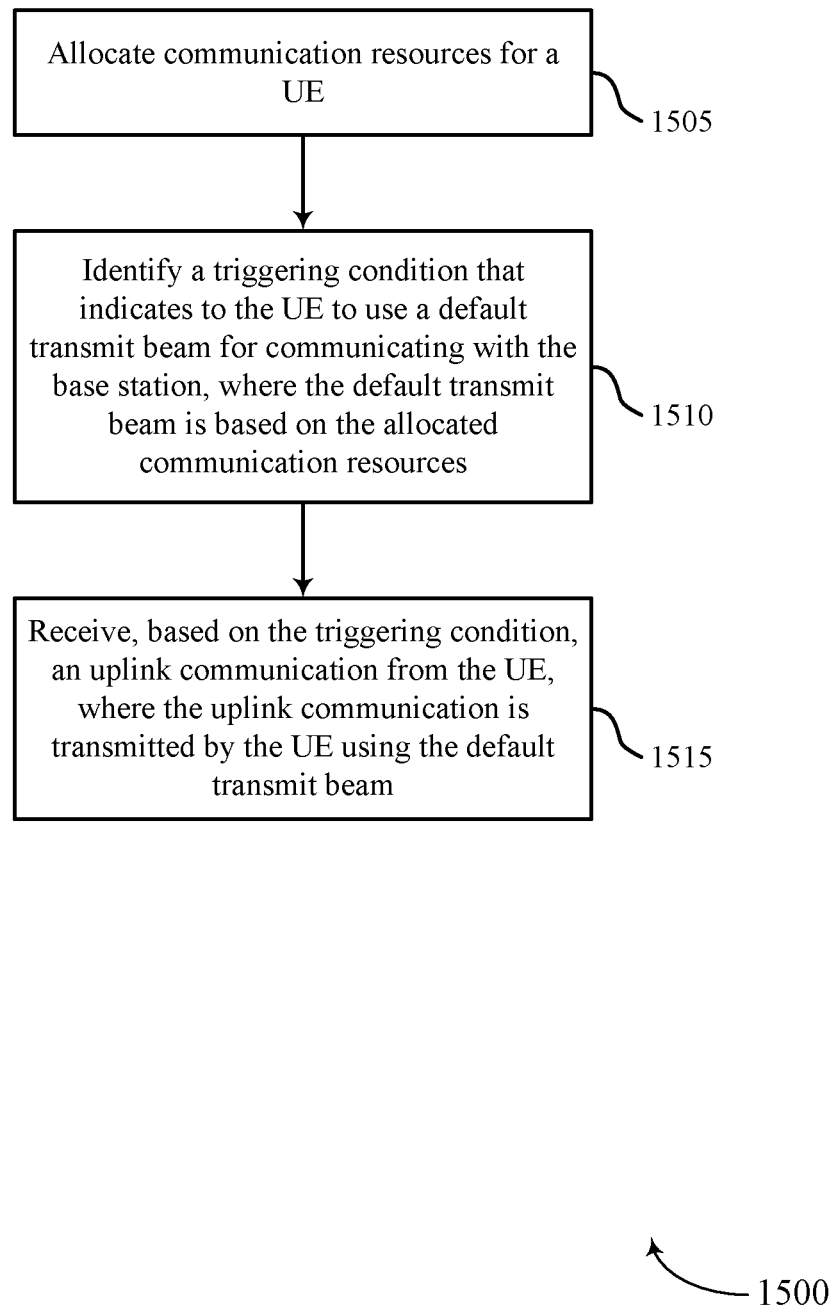

FIG. 15 shows a flowchart illustrating a method 1500 for uplink beam assignment in accordance with aspects of the present disclosure. The operations of method 1500 may be implemented by a base station 105 or its components as described herein. For example, the operations of method 1500 may be performed by a communications manager as described with reference to FIGS. 8 to 11. In some examples, a base station 105 may execute a set of codes to control the functional elements of the device to perform the functions described herein. Additionally or alternatively, the base station 105 may perform aspects of the functions described herein using special-purpose hardware.

At 1505 the base station 105 may allocate communication resources for a UE 115. The operations of 1505 may be performed according to the methods described herein. In certain examples, aspects of the operations of 1505 may be performed by a resource allocator as described with reference to FIGS. 8 to 11.

At 1510 the base station 105 may identify a triggering condition that indicates to the UE 115 to use a default transmit beam for communicating with the base station 105, where the default transmit beam is based on the allocated communication resources. The operations of 1510 may be performed according to the methods described herein. In certain examples, aspects of the operations of 1510 may be performed by a triggering condition monitor as described with reference to FIGS. 8 to 11.

At 1515 the base station 105 may receive, based on the triggering condition, an uplink communication from the UE 115, where the uplink communication is transmitted by the UE 115 using the default transmit beam. The operations of 1515 may be performed according to the methods described herein. In certain examples, aspects of the operations of 1515 may be performed by an uplink manager as described with reference to FIGS. 8 to 11.

Figure 16:
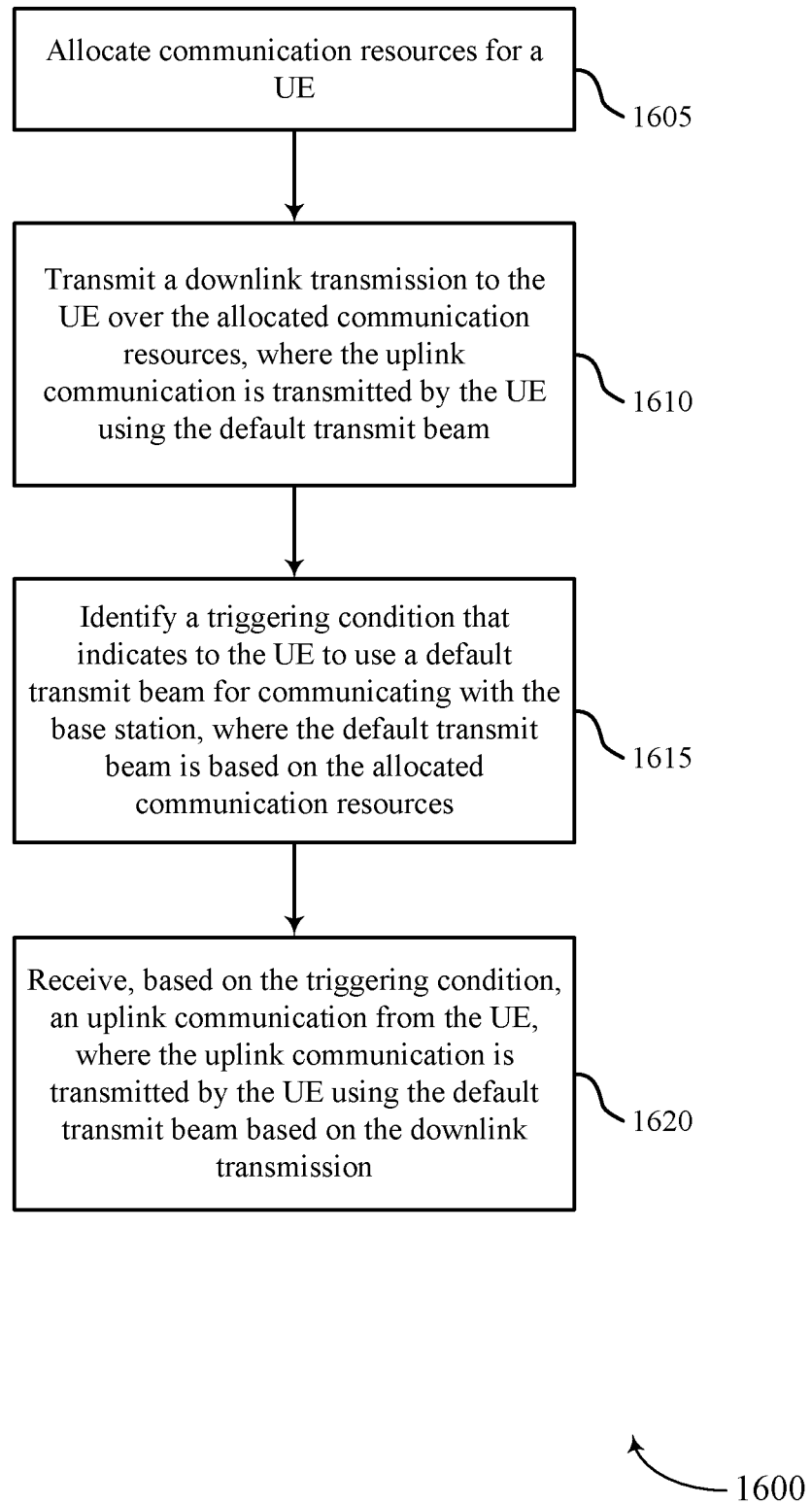

FIG. 16 shows a flowchart illustrating a method 1600 for uplink beam assignment in accordance with aspects of the present disclosure. The operations of method 1600 may be implemented by a base station 105 or its components as described herein. For example, the operations of method 1600 may be performed by a communications manager as described with reference to FIGS. 8 to 11. In some examples, a base station 105 may execute a set of codes to control the functional elements of the device to perform the functions described herein. Additionally or alternatively, the base station 105 may perform aspects of the functions described herein using special-purpose hardware.

At 1605 the base station 105 may allocate communication resources for a UE 115. The operations of 1605 may be performed according to the methods described herein. In certain examples, aspects of the operations of 1605 may be performed by a resource allocator as described with reference to FIGS. 8 to 11.

At 1610 the base station 105 may transmit a downlink transmission to the UE 115 over the allocated communication resources, where the uplink communication is transmitted by the UE 115 using the default transmit beam. The operations of 1610 may be performed according to the methods described herein. In certain examples, aspects of the operations of 1610 may be performed by a downlink manager as described with reference to FIGS. 8 to 11.

At 1615 the base station 105 may identify a triggering condition that indicates to the UE 115 to use a default transmit beam for communicating with the base station 105, where the default transmit beam is based on the allocated communication resources. The operations of 1615 may be performed according to the methods described herein. In certain examples, aspects of the operations of 1615 may be performed by a triggering condition monitor as described with reference to FIGS. 8 to 11.

At 1620 the base station 105 may receive, based on the triggering condition, an uplink communication from the UE 115, where the uplink communication is transmitted by the UE 115 using the default transmit beam based on the downlink transmission. The operations of 1620 may be performed according to the methods described herein. In certain examples, aspects of the operations of 1620 may be performed by an uplink manager as described with reference to FIGS. 8 to 11.

Figure 17:
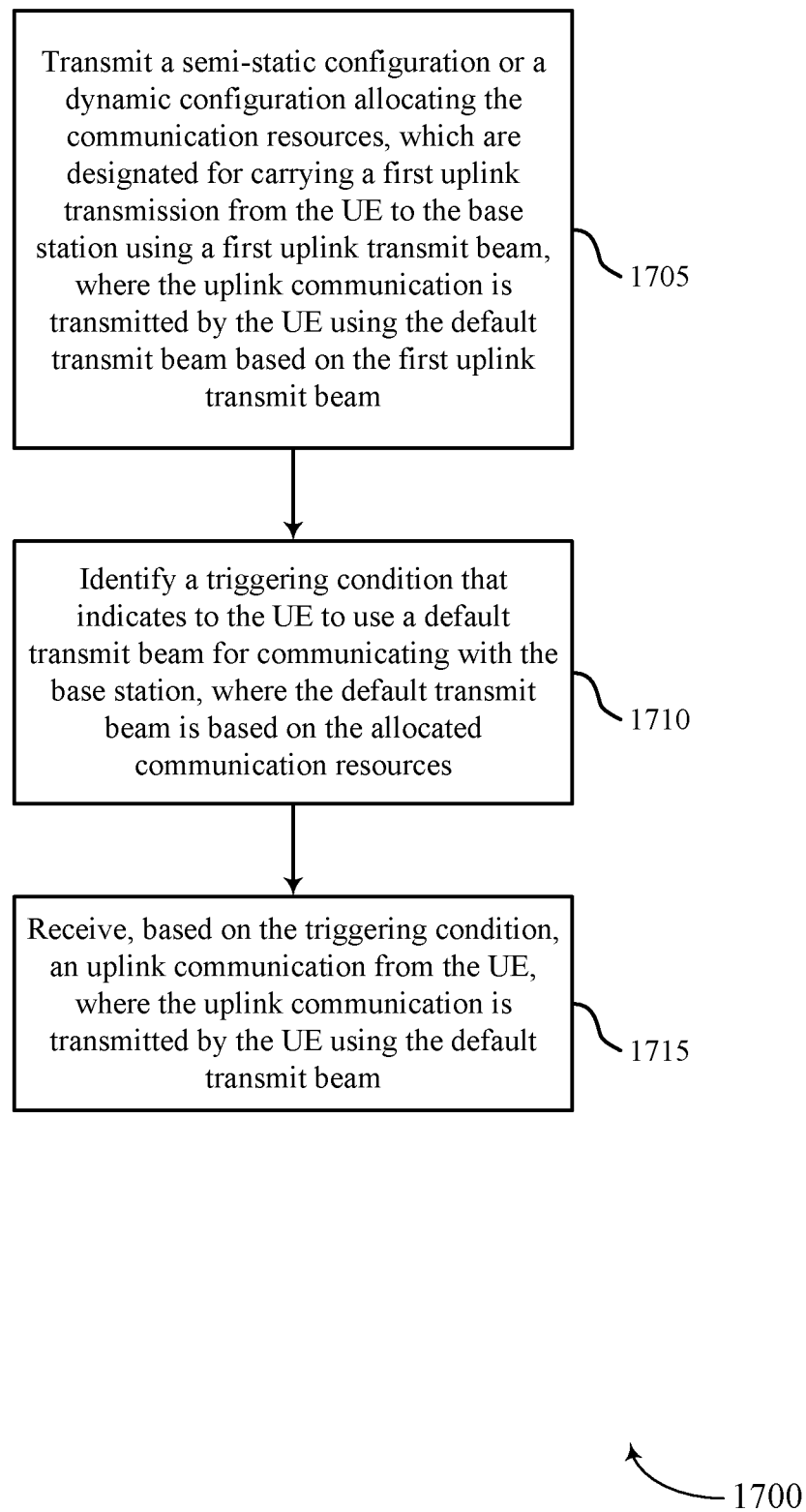

FIG. 17 shows a flowchart illustrating a method 1700 for uplink beam assignment in accordance with aspects of the present disclosure. The operations of method 1700 may be implemented by a base station 105 or its components as described herein. For example, the operations of method 1700 may be performed by a communications manager as described with reference to FIGS. 8 to 11. In some examples, a base station 105 may execute a set of codes to control the functional elements of the device to perform the functions described herein. Additionally or alternatively, the base station 105 may perform aspects of the functions described herein using special-purpose hardware.

At 1705 the base station 105 may transmit a semi-static configuration or a dynamic configuration allocating communication resources to a UE 115, the communication resources designated for carrying a first uplink transmission from the UE 115 to the base station 105 using a first uplink transmit beam, where the uplink communication is transmitted by the UE 115 using the default transmit beam based on the first uplink transmit beam. The operations of 1705 may be performed according to the methods described herein. In certain examples, aspects of the operations of 1705 may be performed by a resource allocator as described with reference to FIGS. 8 to 11.

At 1710 the base station 105 may identify a triggering condition that indicates to the UE 115 to use a default transmit beam for communicating with the base station 105, where the default transmit beam is based on the allocated communication resources. The operations of 1710 may be performed according to the methods described herein. In certain examples, aspects of the operations of 1710 may be performed by a triggering condition monitor as described with reference to FIGS. 8 to 11.

At 1715 the base station 105 may receive, based on the triggering condition, an uplink communication from the UE 115, where the uplink communication is transmitted by the UE 115 using the default transmit beam. The operations of 1715 may be performed according to the methods described herein. In certain examples, aspects of the operations of 1715 may be performed by an uplink manager as described with reference to FIGS. 8 to 11.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple CCs.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other PLD, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   determining, based at least in part on physical uplink control channel (PUCCH) communication resources allocated to the UE by a network device, a default transmit beam for communicating via a physical uplink shared channel (PUSCH) with the network device, wherein determining the default transmit beam comprises:
      receiving a semi-static configuration or a dynamic configuration for the allocated PUCCH communication resources, wherein the allocated PUCCH communication resources are designated for carrying a first uplink transmission to the network device using a first uplink transmit beam, wherein the first uplink transmission comprises a PUCCH transmission and the allocated PUCCH communication resources comprise a PUCCH resource;
      identifying the PUCCH resource from a plurality of PUCCH resources based at least in part on the identified PUCCH resource having a lowest index of the plurality of PUCCH resources; and
      determining the default transmit beam based at least in part on the first uplink transmit beam being carried on the identified PUCCH resource having the lowest index;
   identifying a triggering condition for using the default transmit beam; and
   transmitting, via the PUSCH, an uplink communication to the network device using the default transmit beam based at least in part on the triggering condition.

2. The method of claim 1, wherein identifying the triggering condition comprises:
   receiving, from the network device, an uplink grant that does not contain a PUSCH beam indicator.

3. The method of claim 2, wherein the PUSCH beam indicator comprises a sounding reference signal (SRS) resource indicator (SRI) or a transmission configuration indicator (TCI).

4. The method of claim 1, wherein the PUCCH resource is identified based at least in part on an intended use of the PUCCH resource.

5. The method of claim 4, wherein the intended use of the PUCCH resource comprises one of a scheduling request (SR), a channel quality indicator (CQI) report, or a beam failure recovery.

6. The method of claim 1, wherein the first uplink transmission comprises a sounding reference signal (SRS) transmission, a PUSCH transmission scheduled by an uplink grant that includes a PUSCH beam indicator, a semi-persistent scheduled (SPS) transmission, or a grant-free uplink transmission.

7. The method of claim 1, further comprising:
   identifying the first uplink transmission to be used for determining the default transmit beam from a plurality of candidate uplink transmissions based at least in part on a scheduling parameter of the first uplink transmission, a number of beams associated with the first uplink transmission, a selection indication received from the network device, or a combination thereof.

8. The method of claim 1, wherein identifying the triggering condition comprises:
   identifying uplink data to be transmitted to the network device in the uplink communication; and
   determining that the network device has not transmitted a sounding reference signal (SRS) resource indicator (SRI) indicating a configured uplink transmit beam for the uplink communication.

9. The method of claim 1, wherein identifying the triggering condition comprises:
   identifying a threshold time period preceding the uplink communication; and
   determining that the network device has not transmitted a PUSCH beam indicator indicating a configured uplink transmit beam for the uplink communication prior to the threshold time period.

10. The method of claim 9, wherein the threshold time period is based at least in part on a beam-switching capability of the UE.

11. The method of claim 1, wherein determining the default transmit beam comprises:
    identifying a receive beam used to receive a remaining minimum system information (RMSI) control resource set, wherein the RMSI control resource set comprises the allocated PUCCH communication resources; and
    selecting, prior to a completion of a radio resource control (RRC) configuration, the default transmit beam based at least in part on the receive beam.

12. The method of claim 1, wherein determining the default transmit beam comprises:
    receiving a downlink transmission from the network device over the allocated PUCCH communication resources using a downlink receive beam of one or more downlink receive beams; and
    determining the default transmit beam based at least in part on the downlink receive beam.

13. The method of claim 12, wherein the downlink transmission comprises a physical downlink control channel (PDCCH) transmission and the allocated PUCCH communication resources comprise a PDCCH control resource set.

14. The method of claim 13, further comprising:
    identifying the PDCCH control resource set from a plurality of candidate PDCCH control resource sets based at least in part on an index associated with the PDCCH control resource set.

15. The method of claim 13, further comprising:
    identifying the PDCCH control resource set from a plurality of candidate PDCCH control resource sets based at least in part on a reception time at the UE associated with the PDCCH control resource set.

16. The method of claim 15, further comprising:
selecting, based at least in part on an index associated with the PDCCH control resource set, the PDCCH control resource set from the plurality of candidate PDCCH control resource sets, wherein the plurality of candidate PDCCH control resource sets are associated with a same reception time at the UE.

17. The method of claim 12, wherein receiving the downlink transmission comprises:
receiving one or more channel state information reference signals (CSI-RS) over the allocated PUCCH communication resources, wherein each CSI-RS is received using a respective downlink receive beam of the one or more downlink receive beams;
identifying a given downlink receive beam of the one or more downlink receive beams; and
determining the default transmit beam based at least in part on the given downlink receive beam.

18. The method of claim 12, wherein the downlink transmission comprises a physical downlink shared channel (PDSCH) transmission.

19. The method of claim 12, further comprising:
identifying the downlink transmission to be used for determining the default transmit beam from a plurality of candidate downlink transmissions based at least in part on a scheduling parameter of the downlink transmission, a number of beams associated with the downlink transmission, a selection indication received from the network device, or a combination thereof.

20. The method of claim 1, wherein determining the default transmit beam comprises:
identifying a communication beam corresponding to a recent transmission, the recent transmission comprising a recent uplink transmission or a recent downlink transmission; and
determining the default transmit beam based at least in part on the communication beam.

21. The method of claim 1, wherein transmitting the uplink communication using the default transmit beam comprises:
receiving, from the network device, an update to the allocated PUCCH communication resources; and
determining a second default transmit beam based at least in part on the update, wherein the uplink communication is transmitted using the second default transmit beam.

22. A method for wireless communication at a network device, comprising:
allocating physical uplink control channel (PUCCH) communication resources for a user equipment (UE), wherein allocating the PUCCH communication resources for the UE comprises transmitting a semi-static configuration or a dynamic configuration allocating the PUCCH communication resources, which are designated for carrying a first uplink transmission from the UE to the network device using a first uplink transmit beam;
identifying a PUCCH resource from a plurality of candidate PUCCH resources based at least in part on the identified PUCCH resource having a lowest index of the plurality of candidate PUCCH resources, wherein the first uplink transmission comprises a PUCCH transmission and the allocated PUCCH communication resources comprise the identified PUCCH resource;
identifying a triggering condition that indicates to the UE to use a default transmit beam for communicating via a physical uplink shared channel (PUSCH) with the network device, wherein the default transmit beam is based at least in part on the allocated PUCCH communication resources; and
receiving, based at least in part on the triggering condition, an uplink communication from the UE via the PUSCH, wherein the uplink communication is transmitted by the UE using the default transmit beam, wherein the uplink communication is transmitted by the UE using the default transmit beam based at least in part on the first uplink transmit beam being carried on the identified PUCCH resource having the lowest index.

23. The method of claim 22, wherein identifying the triggering condition comprises:
transmitting, to the UE, an uplink grant that does not contain a PUSCH beam indicator.

24. The method of claim 23, wherein the PUSCH beam indicator comprises a sounding reference signal (SRS) resource indicator (SRI) or a transmission configuration indicator (TCI).

25. The method of claim 22, wherein the PUCCH resource is identified based at least in part on an intended use of the PUCCH resource.

26. The method of claim 25, wherein the intended use of the PUCCH resource comprises one of a scheduling request (SR), a channel quality indicator (CQI) report, or a beam failure recovery.

27. The method of claim 22, wherein the first uplink transmission comprises a sounding reference signal (SRS) transmission, a PUSCH transmission scheduled by an uplink grant that includes a PUSCH beam indicator, a semi-persistent scheduled (SPS) transmission, or a grant-free uplink transmission.

28. The method of claim 22, further comprising:
identifying the first uplink transmission to be used by the UE for determining the default transmit beam from a plurality of candidate uplink transmissions based at least in part on a scheduling parameter of the first uplink transmission, a number of beams associated with the first uplink transmission, a selection indication transmitted by the network device, or a combination thereof.

29. The method of claim 22, wherein allocating the PUCCH communication resources for the UE comprises:
configuring, for the UE, a remaining minimum system information (RMSI) control resource set; and
identifying, prior to a completion of a radio resource control (RRC) configuration, the default transmit beam based at least in part on the RMSI control resource set.

30. The method of claim 22, further comprising:
transmitting a downlink transmission to the UE over the allocated PUCCH communication resources, wherein the uplink communication is transmitted by the UE using the default transmit beam based at least in part on the downlink transmission.

31. The method of claim 30, wherein the downlink transmission comprises a physical downlink control channel (PDCCH) transmission and the allocated PUCCH communication resources comprise a PDCCH control resource set.

32. The method of claim 31, further comprising:
identifying the PDCCH control resource set from a plurality of candidate PDCCH control resource sets based at least in part on an index associated with the PDCCH control resource set.

33. The method of claim 30, wherein transmitting the downlink transmission comprises:
transmitting one or more channel state information reference signals (CSI-RS) over the allocated PUCCH communication resources, wherein the uplink communication is transmitted by the UE using the default transmit beam based at least in part on the one or more CSI-RS.

34. The method of claim 30, wherein the downlink transmission comprises a physical downlink shared channel (PDSCH) transmission.

35. The method of claim 30, further comprising:
identifying the downlink transmission to be used by the UE for determining the default transmit beam from a plurality of candidate downlink transmissions based at least in part on a scheduling parameter of the downlink transmission, a number of beams associated with the downlink transmission, a selection indication received from the network device, or a combination thereof.

36. The method of claim 22, further comprising:
identifying a communication beam corresponding to a recent transmission, the recent transmission comprising a recent uplink transmission from the UE or a recent downlink transmission to the UE, wherein the uplink communication is transmitted by the UE using the default transmit beam based at least in part on the communication beam.

37. The method of claim 22, further comprising:
transmitting, to the UE, an update to the allocated PUCCH communication resources, wherein the uplink communication is transmitted by the UE on the default transmit beam based at least in part on the update.

38. An apparatus for wireless communications, comprising:
a processor,
memory coupled with the processor; and
instructions stored in the memory and executable by the processor, to cause the apparatus to:
determine, based at least in part on physical uplink control channel (PUCCH) communication resources allocated by a network device, a default transmit beam for communicating via a physical uplink shared channel (PUSCH) with the network device, wherein the instructions to determine the default transmit beam are executable by the processor to cause the apparatus to:
receive a semi-static configuration or a dynamic configuration for the allocated PUCCH communication resources, wherein the allocated PUCCH communication resources are designated for carrying a first uplink transmission to the network device using a first uplink transmit beam, wherein the first uplink transmission comprises a PUCCH transmission and the allocated PUCCH communication resources comprise a PUCCH resource;
identify the PUCCH resource from a plurality of PUCCH resources based at least in part on the identified PUCCH resource having a lowest index of the plurality of PUCCH resources; and
determine the default transmit beam based at least in part on the first uplink transmit beam being carried on the identified PUCCH resource having the lowest index;
identify a triggering condition for using the default transmit beam; and
transmit, via the PUSCH, an uplink communication to the network device using the default transmit beam based at least in part on the triggering condition.

39. The apparatus of claim 38, wherein the instructions to identify the triggering condition are executable by the processor to cause the apparatus to:
receive, from the network device, an uplink grant that does not contain a PUSCH beam indicator.

40. The apparatus of claim 39, wherein the PUSCH beam indicator comprises a sounding reference signal (SRS) resource indicator (SRI) or a transmission configuration indicator (TCI).

41. The apparatus of claim 38, wherein the PUCCH resource is identified based at least in part on an intended use of the PUCCH resource.

42. The apparatus of claim 41, wherein the intended use of the PUCCH resource comprises one of a scheduling request (SR), a channel quality indicator (CQI) report, or a beam failure recovery.

43. The apparatus of claim 38, wherein the first uplink transmission comprises a sounding reference signal (SRS) transmission, a PUSCH transmission scheduled by an uplink grant that includes a PUSCH beam indicator, a semi-persistent scheduled (SPS) transmission, or a grant-free uplink transmission.

44. The apparatus of claim 38, wherein the instructions are further executable by the processor to cause the apparatus to:
identify the first uplink transmission to be used for determining the default transmit beam from a plurality of candidate uplink transmissions based at least in part on a scheduling parameter of the first uplink transmission, a number of beams associated with the first uplink transmission, a selection indication received from the network device, or a combination thereof.

45. The apparatus of claim 38, wherein the instructions to identify the triggering condition are executable by the processor to cause the apparatus to:
identify uplink data to be transmitted to the network device in the uplink communication; and
determine that the network device has not transmitted a sounding reference signal (SRS) resource indicator (SRI) indicating a configured uplink transmit beam for the uplink communication.

46. The apparatus of claim 38, wherein the instructions to identify the triggering condition are executable by the processor to cause the apparatus to:
identify a threshold time period preceding the uplink communication; and
determine that the network device has not transmitted a PUSCH beam indicator indicating a configured uplink transmit beam for the uplink communication prior to the threshold time period.

47. The apparatus of claim 46, wherein the threshold time period is based at least in part on a beam-switching capability of the apparatus.

48. The apparatus of claim 38, wherein the instructions to determine the default transmit beam are executable by the processor to cause the apparatus to:
identify a receive beam used to receive a remaining minimum system information (RMSI) control resource set, wherein the RMSI control resource set comprises the allocated PUCCH communication resources; and
select, prior to a completion of a radio resource control (RRC) configuration, the default transmit beam based at least in part on the receive beam.

49. The apparatus of claim 38, wherein the instructions to determine the default transmit beam are executable by the processor to cause the apparatus to:

receive a downlink transmission from the network device over the allocated PUCCH communication resources using a downlink receive beam of one or more downlink receive beams; and determine the default transmit beam based at least in part on the downlink receive beam.

50. The apparatus of claim 49, wherein the downlink transmission comprises a physical downlink control channel (PDCCH) transmission and the allocated PUCCH communication resources comprise a PDCCH control resource set.

51. The apparatus of claim 50, wherein the instructions are further executable by the processor to cause the apparatus to:

identify the PDCCH control resource set from a plurality of candidate PDCCH control resource sets based at least in part on an index associated with the PDCCH control resource set.

52. The apparatus of claim 50, wherein the instructions are further executable by the processor to cause the apparatus to:

identify the PDCCH control resource set from a plurality of candidate PDCCH control resource sets based at least in part on a reception time at the apparatus associated with the PDCCH control resource set.

53. The apparatus of claim 52, wherein the instructions are further executable by the processor to cause the apparatus to:

select, based at least in part on an index associated with the PDCCH control resource set, the PDCCH control resource set from the plurality of candidate PDCCH control resource sets, wherein the plurality of candidate PDCCH control resource sets are associated with a same reception time at the apparatus.

54. The apparatus of claim 49, wherein the instructions to receive the downlink transmission are executable by the processor to cause the apparatus to:

receive one or more channel state information reference signals (CSI-RS) over the allocated PUCCH communication resources, wherein each CSI-RS is received using a respective downlink receive beam of the one or more downlink receive beams;

identify a given downlink receive beam of the one or more downlink receive beams; and determine the default transmit beam based at least in part on the given downlink receive beam.

55. The apparatus of claim 49, wherein the downlink transmission comprises a physical downlink shared channel (PDSCH) transmission.

56. The apparatus of claim 49, wherein the instructions are further executable by the processor to cause the apparatus to:

identify the downlink transmission to be used for determining the default transmit beam from a plurality of candidate downlink transmissions based at least in part on a scheduling parameter of the downlink transmission, a number of beams associated with the downlink transmission, a selection indication received from the network device, or a combination thereof.

57. The apparatus of claim 38, wherein the instructions to determine the default transmit beam are executable by the processor to cause the apparatus to:

identify a communication beam corresponding to a recent transmission, the recent transmission comprising a recent uplink transmission or a recent downlink transmission; and determine the default transmit beam based at least in part on the communication beam.

58. The apparatus of claim 38, wherein the instructions to transmit the uplink communication using the default transmit beam are executable by the processor to cause the apparatus to:

receive, from the network device, an update to the allocated PUCCH communication resources; and determine a second default transmit beam based at least in part on the update, wherein the uplink communication is transmitted using the second default transmit beam.

59. An apparatus for wireless communications at a network device, comprising:

a processor, memory coupled with the processor; and instructions stored in the memory and executable by the processor, to cause the apparatus to:

allocate physical uplink control channel (PUCCH) communication resources for a user equipment (UE), wherein allocating the PUCCH communication resources for the UE comprises transmitting a semi-static configuration or a dynamic configuration allocating the PUCCH communication resources, which are designated for carrying a first uplink transmission from the UE to the network device using a first uplink transmit beam;

identify a PUCCH resource from a plurality of candidate PUCCH resources based at least in part on the identified PUCCH resource having a lowest index of the plurality of candidate PUCCH resources, wherein the first uplink transmission comprises a PUCCH transmission and the allocated PUCCH communication resources comprise the identified PUCCH resource;

identify a triggering condition that indicates to the UE to use a default transmit beam for communicating via a physical uplink shared channel (PUSCH) with the network device, wherein the default transmit beam is based at least in part on the allocated PUCCH communication resources; and receive, based at least in part on the triggering condition, an uplink communication from the UE via the PUSCH, wherein the uplink communication is transmitted by the UE using the default transmit beam;

wherein the uplink communication is transmitted by the UE using the default transmit beam based at least in part on the first uplink transmit beam being carried on the identified PUCCH resource having the lowest index.

60. The apparatus of claim 59, wherein the instructions to identify the triggering condition are executable by the processor to cause the apparatus to:

transmit, to the UE, an uplink grant that does not contain a PUSCH beam indicator.

61. The apparatus of claim 60, wherein the PUSCH beam indicator comprises a sounding reference signal (SRS) resource indicator (SRI) or a transmission configuration indicator (TCI).

62. The apparatus of claim 59, wherein the PUCCH resource is identified based at least in part on an intended use of the PUCCH resource.

63. The apparatus of claim 62, wherein the intended use of the PUCCH resource comprises one of a scheduling request (SR), a channel quality indicator (CQI) report, or a beam failure recovery.

64. The apparatus of claim 59, wherein the first uplink transmission comprises a sounding reference signal (SRS) transmission, a PUSCH transmission scheduled by an uplink grant that includes a PUSCH beam indicator, a semi-persistent scheduled (SPS) transmission, or a grant-free uplink transmission.

65. The apparatus of claim 59, wherein the instructions are further executable by the processor to cause the apparatus to:
identify the first uplink transmission to be used by the UE for determining the default transmit beam from a plurality of candidate uplink transmissions based at least in part on a scheduling parameter of the first uplink transmission, a number of beams associated with the first uplink transmission, a selection indication transmitted by the network device, or a combination thereof.

66. The apparatus of claim 59, wherein the instructions to allocate the PUCCH communication resources for the UE are executable by the processor to cause the apparatus to:
configure, for the UE, a remaining minimum system information (RMSI) control resource set; and
identify, prior to a completion of a radio resource control (RRC) configuration, the default transmit beam based at least in part on the RMSI control resource set.

67. The apparatus of claim 59, wherein the instructions are further executable by the processor to cause the apparatus to:
transmit a downlink transmission to the UE over the allocated PUCCH communication resources, wherein the uplink communication is transmitted by the UE using the default transmit beam based at least in part on the downlink transmission.

68. The apparatus of claim 67, wherein the downlink transmission comprises a physical downlink control channel (PDCCH) transmission and the allocated PUCCH communication resources comprise a PDCCH control resource set.

69. The apparatus of claim 68, wherein the instructions are further executable by the processor to cause the apparatus to:
identify the PDCCH control resource set from a plurality of candidate PDCCH control resource sets based at least in part on an index associated with the PDCCH control resource set.

70. The apparatus of claim 67, wherein the instructions to transmit the downlink transmission are executable by the processor to cause the apparatus to:
transmit one or more channel state information reference signals (CSI-RS) over the allocated PUCCH communication resources, wherein the uplink communication is transmitted by the UE using the default transmit beam based at least in part on the one or more CSI-RS.

71. The apparatus of claim 67, wherein the downlink transmission comprises a physical downlink shared channel (PDSCH) transmission.

72. The apparatus of claim 67, wherein the instructions are further executable by the processor to cause the apparatus to:
identify the downlink transmission to be used by the UE for determining the default transmit beam from a plurality of candidate downlink transmissions based at least in part on a scheduling parameter of the downlink transmission, a number of beams associated with the downlink transmission, a selection indication received from the network device, or a combination thereof.

73. The apparatus of claim 59, wherein the instructions are further executable by the processor to cause the apparatus to:
identify a communication beam corresponding to a recent transmission, the recent transmission comprising a recent uplink transmission from the UE or a recent downlink transmission to the UE, wherein the uplink communication is transmitted by the UE using the default transmit beam based at least in part on the communication beam.

74. The apparatus of claim 59, wherein the instructions are further executable by the processor to cause the apparatus to:
transmit, to the UE, an update to the allocated PUCCH communication resources, wherein the uplink communication is transmitted by the UE on the default transmit beam based at least in part on the update.

\* \* \* \* \*